United States Patent [19]

Bailey

[11] 4,049,748

[45] Sept. 20, 1977

[54] UNSATURATED POLYESTERS COMBINED WITH ORGANOALUMINUM COMPOUNDS

[75] Inventor: Wesley T. Bailey, Palos Verdes, Calif.

[73] Assignee: Chattem Drug & Chemical Company, Chattanooga, Tenn.

[21] Appl. No.: 651,814

[22] Filed: Jan. 23, 1976

[51] Int. Cl.$^2$ .............................................. C08L 67/06
[52] U.S. Cl. .................................. 260/861; 260/863; 260/864; 260/865; 260/866
[58] Field of Search ................. 260/863, 864, 865, 861

[56] References Cited

U.S. PATENT DOCUMENTS

| 3,361,845 | 1/1968 | Watanabe et al. | 260/863 |
|---|---|---|---|
| 3,494,978 | 2/1970 | Moller | 260/861 X |
| 3,536,642 | 10/1970 | Williger | 260/863 X |
| 3,553,293 | 1/1971 | Stahly et al. | 260/863 X |
| 3,894,984 | 7/1975 | Demmler et al. | 260/863 X |

OTHER PUBLICATIONS

Miles et al., *Polymer Technology* (Temple, 1965) p. 69.

*Primary Examiner*—Murray Tillman
*Assistant Examiner*—T. De Benedictis, Sr.

[57] ABSTRACT

Curable polyester resin compositions of unsaturated polyester resin and organoaluminum compound are dissolved together in a vinyl monomer liquid. Viscosity characteristics of such liquid compositions are regulatable by such organoaluminum compound addition. Cured product resins display improved chemical resistance.

31 Claims, 2 Drawing Figures

UNSATURATED POLYESTERS COMBINED WITH ORGANOALUMINUM COMPOUNDS

BACKGROUND OF THE INVENTION

Polyester resins, which are polycondensation products of polycarboxylic acids with polyhydroxyalcohols (polyols), are conventionally preparable in the form of unsaturated structures which can be cross linked through their double bonds with a compatible monomer, and thus made thermosetting. Typical unsaturated polyesters are made by condensing dihydroxyalcohols with dicarboxylic acids, at least a portion of such acids containing ethylenic unsaturation. Usually, unsaturated polyester resins are prepared and sold commercially as solutions of unsaturated polyester in a liquid vinyl monomer. Such a solution can be hardened (cross-linked) into a solid form under controlled conditions in the substantially complete absence of water typically involving the use of an initiator admixed in small quantities therewith, though, in general, such a solution can be hardened by means of light, heat, and/or free radicals.

Because of the characteristic low viscosity of such solutions, it is difficult to make such stay-put during application thereof, as in lay-ups thereof in combination with fiberglass in making wall portions of boats, storage tanks, truck cabs, and the like. Heretofore, the art has only been able to control the viscosity of such solutions through the addition thereto of controlled amounts of fumed silica (pyrogenic silica) which result in a thickening of such solutions.

The use of fumed silicas in liquid polyester resin systems has disadvantages and causes problems. For one thing, fumed silicas characteristically have a low density and tend to cause dust in areas of use which can produce a health hazard to exposed personnel. Even with best practice, the use of inconvenient respiration masks are required. In addition, fumed silicas must be incorporated into a liquid resin system with high shear mixing equipment which appreciably adds to the cost and time involved in liquid unsaturated polyester resin manufacture.

In addition, the presence of fumed silica in a liquid curable polyester system prevents the production of clear solid polyester resin products therefrom which is undesirable in some circumstances because a plurality of end use applications exist where clear solid polyester resins are needed or desired; such as where solid polyester resins are needed or desired; such as where solid polyester resins are needed or desired, such as where pigments are to be added and no change in optical properties is desired.

Also, fumed silicas in cured polyesters tend to reduce the chemical stability thereof apparently because of a type of wicking action caused therewith, plus the hydrophylic nature of the fumed silicas.

Further, fumed silicas behave in liquid polyester solutions as fillers. Thus, while they can add to the mechanical structure of a cured product, they do not become part of the molecular structure of such product. For example, in some applications, the fumed silica, in effect, causes a fabricator to sacrifice incorporating a maximum quantity of fibrous reinforcing filler into a lay-up which would otherwise be a greater amount of such filler if there were not a requirement for using fumed silica in his lay-up liquid resin in order to achieve the viscosity characteristics he needs for stay put during a fabrication procedure.

In view of the problems and disadvantages of employing fumed silicas in curable liquid unsaturated polyester systems, the art needs alternative means for controlling the viscosity characteristics of such liquids, and hopefully, for also improving the physical properties of the resulting cross-linked (cured) solid products derived therefrom.

So far as is known, no one has heretofore employed organoaluminum compounds in anhydrous unsaturated polyester systems dissolved in liquid vinyl monomers. If water is present, the aluminum compound reacts therewith, not with the polyester resin system. Thus, while Okada et al in Japanese Pat. No. 74/16,792 (application No. 72/55,390 filed June. 1, 1972) describe water containing polyester moldings which are hardenable in the presence of an aluminum alkoxide and an initiator, no one has ever heretofore used aluminum alkoxides in anhydrous unsaturated liquid polyester systems or made cured resins therefrom. The reactions involved and the results obtained in the latter instance are surprising and unexpected compared to such prior art as represented by Okada et al.

Ko et al in Japanese Pat. No. 74/93,424 used aluminum complexes as hardening agents for a methylmethacrylate copolymer differing from the present invention in that the quantity used produced hardening or curing. The same is true of Japanese Pat. No. 74/32,676, in which aluminum chelates were used as a polymerization catalyst to produce a poly-(ethylene terephthalate). The aluminum octanoate of Japanese Pat. No. 73/90,382 differs from the aluminum derivatives of this present invention in that the aluminum octanoate is a basic aluminum salt. Japanese Pat. No. 71/40,713, uses aluminum alkoxides as catalysts for preparing polyesters, making use of the well known ability of aluminum alkoxides to catalize ester exchange reactions. Jacobus Rinse in U.S. Pat. No. 3,141,007 uses massive amounts of aluminum isopropoxide with maleic anhydride and methylmethacrylate to form a composition in which the aluminum compounds have participated as ingredients and also as polymerization catalysts. In British Pat. No. 920,902, Watanabe et al used aluminum alkoxides to produce a stable solid gel for molding materials in the form of sheets or blocks.

None of the prior art above teaches the principles employed in the present invention, which involve use of organic aluminum derivatives in an anhydrous wholly liquid unsaturated polyester resin system, at temperatures from ambient to about 100° C to produce a non-Newtonian liquid whose thixotropic character allows it to be conveniently used for laminating, spraying, hand lay-up, and the like, and further producing a cured resin with superior chemical resistance properties. See also, Japanese Pat. No. 36(9), 423-8, 1963.

The use of organoaluminum compounds in unsaturated polyester resins is to be distinguished from the use of organoaluminum compounds in alkyd resins. For one thing, alkyd resins employ fatty acids while unsaturated polyester resins do not. For another thing, alkyd resins characteristically employ tri and tetra functional polyols while unsaturated polyester resins employ primarily difunctional polyols. For still another thing, alkyd resins cure by oxidation polymerization, not addition polymerization as in the case of unsaturated polyester resins. Also alkyd resins are used primarily in coating type application situations whereas unsaturated polyester resins characteristically are used primarily in molding applications. The technology of alkyd resins is thus not equivalent to that of liquid unsaturated polyester resin systems.

BRIEF SUMMARY OF THE INVENTION

There has now been discovered a new and very useful technique by which the use of fumed silicas in liquid unsaturated polyester resin systems can be substantially completely avoided if desired, and by which cured polyester solid resins having improved chemical resistance can be produced without sacrifice of desired resin physical strength characteristics. When using this technique moreover, improved viscosity and thixotropic liquid resin characteristics are surprisingly achieved in a controlled manner, and clear cured resins are producible. These and other benefits are achieved with reduced costs of manufacture.

More particularly, the present invention relates to substantially anhydrous copolymerizable non-Newtonian liquid unsaturated polyester resin compositions which comprise on a 100 weight percent total composition basis from about 20 to 90 weight percent of an unsaturated polyester resin, from about 0.1 to 20 weight percent of at least one organoaluminum compound, and from about 10 to 80 weight percent of a liquid comprising at least one vinyl monomer. The unsaturated polyester resin and the organoaluminum compound are substantially completely dissolved in such liquid. The exact amount of such organoaluminum compound present within the range just indicated in any given composition is never more than that which maintains the composition in a liquid phase condition. An initial concentrate may be prepared, but the entire composition at time of curing has a Brookfield viscosity of from about 500 to 7000 centipoises at a shear rate of about 1.2 sec$^{-1}$ at about 25° C and also at such time a thixotropic index (sometimes called "thix index") of from about 1.1 to 7.5 at 25° C. The invention further relates to inhibited compositions of the type just characterized.

The present invention further relates to the cured solid polyester resin products produced by copolymerizing (curing) such liquid compositions.

The invention further relates to storage stable compositions useful in the manufacture of such liquid polyester resin compositions wherein an organoaluminum compound is dissolved in a vinyl monomer together with at least one inhibitor.

The present invention further relates to processes for making a liquid copolymerizable polyester resin composition containing incorporated thereinto at least one organoaluminum compound. The invention further relates to processes for copolymerizing such liquid polyester resin compositions into a solid form. The invention further relates to a method for controlling the viscosity characteristics of compolymerizable polyester resins dissolved in liquid vinyl monomers.

Compared to prior art copolymerizable liquid polyester resin compositions, the liquid polyester resin compositions of this invention are characterized by thixotropic viscosity characteristics which enable one to avoid or to substantially prevent the so-called "running" and "sagging" of polyester liquid compositions of this invention during their application in such use situations as in layups with fiberglass in the making of wall members in such articles of manufacture as boats, storage tanks, truck bodies, and the like, where stay-put characteristics are desirable. In addition, this invention provides a valuable tool for adjusting the viscosity characteristics of liquid polyester resins to a predetermined desired value using organoaluminum compounds, which adjustment was not previously achievable in this art.

These viscosity characteristics are achieved through the use of compounds which become chemically incorporated into the structure of the product copolymerized solid resin structure. By the prior art, only the addition of foreign particulate materials, such as fumed silica, were available to alter viscosity characteristics of liquid polyester resins, as indicated above, and such prior art materials were not chemically incorporated into the cured resin structure. In contrast to prior art copolymerized polyester resin systems containing fumed silica, the copolymerized polyester resin compositions of this invention are clear so that the improvement in viscosity is not obtained with a consequent loss in resin clarity as previously known in this art.

When liquid polyester resin compositions of this invention are copolymerized into a solid mass, the product has improved chemical resistance compared to corresponding fumed silica filled solid copolymerized polyester resins of the prior art, particularly as regards hydrolytic stability.

The teachings of the present invention permit one to avoid the use of colloidal silicas, such as fumed silica, which have heretofore been the only means of increasing the viscosity of liquid unsaturated polyester resins for improved application purposes and which have various disadvantages and problems as has been pointed out above.

Furthermore, the use of organoaluminum compounds as taught by the present invention in polyester resins substantially cuts the cost of manufacturing such resins compared to the cost of manufacturing resins in liquid form with equivalent viscosity characteristics using fumed silicas.

Other and further objects, aims, purposes, advantages, features and the like will become apparent to those skilled in the art from a reading of the present invention taken together with the appended drawings.

DETAILED DESCRIPTION

Figure 2:
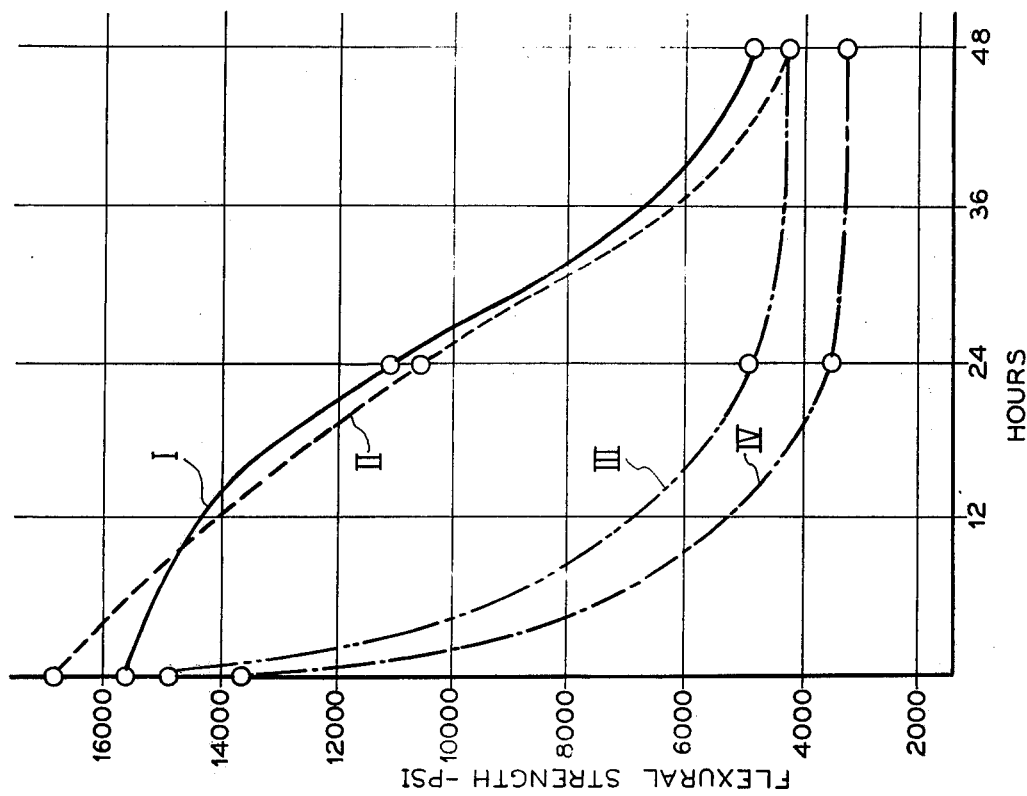
FIG. 2 illustrates, for each of various cured solid polyester resins having incorporated thereinto organoaluminum compound the graphical relationship between flexural strength as ordinates versus soak time of boiling such solid resins in distilled water as abscissae.

Unsaturated polyester resins employed in the practice of the present invention have a molecular weight ranging from about 1,000 to 30,000 (as determined, for example, by gel permeation chromatography, or the like). Such unsaturated polyester resins are comprised of a condensate of at least one polyol with at least one polycarboxylated compound. Starting materials and condensation conditions employed in the manufacture of such unsaturated polyester resins are well known to the prior art (see, for example, "Polyester Resins" by John R. Lawrence published by Van Nostrand Reinhold Company, 1960, "Polyesters and Their Applications" by Bjorksten Research Laboratories, Inc., Reinhold Publishing Corporation, 1956, and the like).

One preferred class of unsaturated polyester resin for use in the present invention is a condensate of a mixture which initially comprises on a 100 weight percent total mixture basis a. from about 20 to 65 weight percent of at least one first carboxylic acid material selected from the group consisting of aromatic dicarboxylic acids and anhydrides thereof, such first carboxylic acid material having its carboxylic group carbon atoms each directly bonded to a ring carbon atom, and further having from 8 through 12 carbon atoms per molecule, b. from about 10 to 50 weight percent of at least one second carboxylic acid material selected from the group consisting of ethylenically unsaturated aliphatic dicarboxylic acids and anhydrides thereof, said second carboxylic acid material having from 4 through 7 carbon atoms per molecule, and c. from about 40 to 60 weight percent of at least one saturated glycol containing from 2 through 7 carbon atoms per molecule.

The respective quantity of component (c) relative to components (a) and (b) is such that the resulting condensate can comprise (and preferably does comprise) a substantially completely non-volatile resin. For purposes of this invention, the volatility (or non-volatility) of a polyester resin can be determined by Federal Specification Test Procedure No. TTP-141b, Method 404.2.

Examples of suitable such first carboxylic acid materials include phthalic anhydride (presently preferred), isophthalic acid, tetrahydrophthalic anhydride, hexahydrophthalic anhydride, hexachloroendomethylene tetrahydrophthalic acid, and the like.

Examples of such second carboxylic acid materials include maleic anhydride, fumaric acid, chloromaleic acid, itaconic acid, citraconic acid, mesaconic acid, and the like. Maleic anhydride is presently preferred.

Examples of suitable saturated such glycols include ethylene glycol, propylene glycols, butylene glycols, diethylene glycol, dipropylene glycol, triethylene glycol, isopropylidene bis-(p-phenyleneoxypropanol-2), and the like. Ethylene glycol, diethylene glycol and propylene glycols are presently preferred.

In addition to such first carboxylic acid material and such second carboxylic acid material, said unsaturated polyester resin may contain optionally on a 100 weight percent total starting monomer mixture basis additionally up to about 60 weight percent of at least one third carboxylic acid material consisting of saturated aliphatic dicarboxylic acids and anhydrides thereof containing from 4 through 10 carbon atoms per molecule. Examples of such third carboxylic acid materials include succinic acid, glutaric acid, adipic acid, pimelic acid, suberic acid, azelaic acid, sebacic acid, and the like. Presently preferred such materials are succinic acid and adipic acid.

In addition to the above examples of di-functional materials, as those skilled in the art appreciate, copolymerizable liquid unsaturated polyester resin compositions of the type usable in this invention may have incorporated thereinto limited minor amounts (typically for example less than about 5 weight percent total resin weight basis) of various other starting materials known to the polyester resin art having a higher or lower functionality, such as benzoic acid, glycerol, and the like.

The vinyl monomer material comprising the liquid solvent portion of a copolymerizable liquid polyester resin composition of the present invention characteristically generally has a molecular weight ranging from about 100 to 250 (and preferably from about 104 to 118), though larger and smaller molecular weight monomers can be employed. Also, the liquid has a boiling point greater than about 100° C., and preferably in the range of from about 145° to 170° C. Examples of suitable vinyl monomers include styrene, methyl methacrylate, vinyl toluene, alpha-methyl styrene, divinyl benzene, dichlorostyrene, diallyl phthalate, triallyl cyanurate, and the like. Styrene, vinyl toluene, and methyl methacrylate are presently preferred.

The aluminum derivatives employed in the practice of the present invention are known to the prior art generally, as are methods for their preparation (see exemplary preparations in: "Organic Reactions", Vol. II, Roger Adams, ed., pp 198–199, John Wiley & Sons Inc., 1944, or "Aluminum Isopropoxide — Its Reactions and Derivatives", Bulletin of Chattem Chemicals, Chattanooga, TN 37409, and the like).

An organoaluminum compound useful in the practice of the present invention is characterized by:

1. containing at least one aluminum atom per molecule,
2. containing at least one oxygen atom per molecule,
3. containing at least four carbon atoms per molecule at least two of which are bonded directly to one another by one or two bonds in a carbon-to-carbon chain,
4. each said aluminum atom having three bonds and being bonded by at least one of such bonds to one of the carbon atoms in said chain through one of said oxygen atoms intermediately, said carbon atom so bonded having additionally no oxygen atoms double bonded thereto,
5. being soluble in styrene to a weight percentage at least about equal to the weight percentage of such organoaluminum compound which is employed in a given liquid curable polyester resin composition of this invention,
6. having a formula weight of from about 130 to 1000,
7. causing a cloudy dispersion of alumina particles to form when a 10 weight percent solution of such organoaluminum compound in anhydrous benzene is admixed with benzene saturated with distilled water and the resulting mixture is heated for four hours at 60° C.

Typically and preferably, such an organoaluminum compound contains not more than 2 aluminum atoms per formula weight, and not less than 4 carbon atoms per formula weight, and not more than 6 oxygen atoms per formula weight. Also typically and preferably, such an organoaluminum compound has a formula weight of from about 200 to 300. Preferably the amount of organoaluminum compound present in any given resin composition of this invention ranges from about 0.2 to 10 weight percent (total weight basis) within liquid composition limits, as indicated. Preferably each aluminum atom in such an organoaluminum compound is triple bonded through three different oxygen atoms to different respective hydrocarbon-type radicals, preferably alkyl, aryl, (including alkyl and alkenyl substituted aryl), or alkenyl. A given organoaluminum compound may be mono, -di- or tri- functional as regards its reactivity with, for example, carboxyl and hydroxyl groups.

More preferred types and examples of suitable aluminum derivatives include aluminum alkoxides wherein the alcohol moiety contains from about 4 to 60 carbon atoms per molecule. Preferred aluminum alkoxides for use in this invention contain from about 9 through about 15 carbon atoms per alkyl group. Examples include aluminum tripropoxide, aluminum tri-isopropoxide, aluminum tri-butoxide, aluminum tri-sec-butoxide, aluminum tri-isobutoxide, aluminum tri-isononyloxide, aluminum tridecyloxide, aluminum trihexadecyloxide, aluminum tri-cyclohexyloxide, aluminum tri-cinnamyloxide, and the like. Aluminum derivatives with mixed alcohol groups may be employed, such as aluminum di-isopropoxide sec-butoxide, and the like. Aluminum isopropoxide and aluminum sec-butoxide are preferred starting materials.

Aluminum alkenyloxides are another more preferred type, such as those where the organic alcohol moiety contains from about 4 to 20 carbon atoms per molecule. Presently most preferred aluminum alkenyloxides for this invention contain from about 6 to about 12 carbon atoms per alkyl group. A preferred such starting material is aluminum tri-allyloxide.

Aluminum aryloxides are another more preferred type, such as those where the phenolic moiety contains from about 18 to 60 carbon atoms per molecule. Preferred aluminum aryloxides for this invention contain from about 18 to 36 carbon atoms per alkyl radical. Examples include aluminum tri-phenoxide, aluminum tri-tert-butylphenoxide, and the like.

Aluminum monoetherglycolates (aluminum alkoxyalkoxides) is another more preferred type, such as those where the monoether of the glycol contains from about 5 to 60 carbon atoms per molecule. Preferred examples include aluminum tri-methoxyethoxide, aluminum tri-ethoxyethoxide, aluminum tri-butoxyethoxide, aluminum tri-hexyloxyethoxide, and the like.

Aluminum monoetherdiethylenglycolates (aluminum alkoxy) (alkoxy)$_n$ alkoxides where $n$ can range from 1 through, for example 4, and where preferably each "alk" group contains preferably from 1 through 7 carbon atoms each are another more preferred type such as those where, for example, the monoether of the diethylene glycol contains from about 6 to 60 carbon atoms per molecule. Preferred examples include aluminum tri-methoxyethoxyethoxide, aluminum tri-ethoxyethoxyethoxides, aluminum tri-butoxyethoxyethoxyethoxide, aluminum tri-hexyloxyethoxyethoxide, and the like.

Aluminum acyloxides are another more preferred type such as those where the acyl moiety contains from about 4 to 60 carbon atoms per molecule. Preferred examples include aluminum tri-benzoate, aluminum tri-salicylate, aluminum tri-maleate, aluminum tri-cinnamate, and the like.

Aluminum chelates may be used where the chelate portion of the molecule contains from about 5 to 20 carbon atoms per molecule. Preferred examples include aluminum triacetylacetonate, aluminum acetoacetic ester chelate, and the like.

It is common to build into an aluminum derivative of a type suitable for use in the practice of this invention several different functional groups to modify the action of the aluminum to provide solubility in the system, for enhanced physical properties, for ease of handling, for resistance to hydrolysis, or for multiple other reasons. Starting with an aluminum alkoxide, such as aluminum isopropoxide, or aluminum sec-butoxide, any one or all of the alkoxy groups may be replaced with a radical derived from an alcohol, an aliphatic acid, an aromatic acid, a diketone, an oxygen compound, a phenol compound, compounds with keto-enol tautomerism, a glycol monoether, a diethyleneglycol monoether, a glyceroldiacetate, or the like.

Thus, for example, suitable organo aluminum compounds of mixed functionality are available as items of commerce. The possible permutations become so large that it is too lengthy to mention them all, but it is my intention generally to include all organoaluminum compounds within the scope of my invention as above defined. A few examples of aluminum derivatives of mixed functionality include aluminum isopropoxide stearate acetoacetic ester chelate, aluminum di-isopropoxide linoleate, aluminum di-isopropoxide p-tert.-butylbenzoate, aluminum disec.-butoxide methoxyethoxide, trioxyaluminum tri-isopropoxide, trioxyaluminum tritallate, aluminum di-methoxyethoxide butoxyethoxide, aluminum di-isopropoxide acetoacetic ester chelate, aluminum disec.-butoxide acetoacetic ester chelate, aluminum di-isopropoxide tridecyloxide, aluminum disec.-butoxide phenoxide, aluminum isopropoxide methoxy ethoxide butoxyethoxide, and the like.

Presently most preferred particular organoaluminum compounds adapted for use in this invention include aluminum tri-sec-butoxide, aluminum tri-isopropoxide, aluminum tri-methoxyethoxide, aluminum tri-ethoxyethoxide, and aluminum tri-2-ethyl hexanyloxide.

Aluminum tri-alkyls are specifically excluded from the practice of this invention. They differ from the aluminum derivatives employed in this invention in that aluminum alkyls have carbon atoms directly attached to each of the three valences of the aluminum atom rather than an attachment through an oxygen atom. Thus, such aluminum alkyls are an entirely different class of compound possessing higher reactivity. Aluminum alkyls are characteristically pyrophoric.

Basic salts of aluminum are likewise specifically excluded from the practice of this invention. Such aluminum salts as aluminum stearate have long been used as thickening agents in the petroleum industry; this material is produced typically commercially from sodium stearate and $AlCl_3$, and the product is hydroxyl aluminum di-stearate containing unreacted stearic acid. These compounds achieve their technical effect by a different mechanism. They have limited solubility in polar solvents and do not react with water whereas the aluminum derivatives employed in the present invention characteristically have increased solubility in polar solvents and are hydrolyzed by water to produce hydrated alumina and thereby free the other moiety.

Copolymerizable unsaturated polester resin compositions of this invention are characteristically in the physical form of non-Newtonian liquids, not gels and they are substantially completely free of water (e.g. they are substantially anhydrous). While, as indicated herein, the quantity of organoaluminum compound or compounds present in any given such composition can vary over the ranges indicated, the quantity so present is selected so as to be not more than that which will permit the product composition to remain in a liquid (pourable) condition. This maximum quantity will vary from one system to another and it is not possible, owing to the large number of possible variables involved to state the exact maximum for all systems within the scope of the teachings of the present invention as those skilled in the art will readily appreciate.

Liquid polyester resin compositions of the present invention, as those skilled in the art will appreciate, can be prepared by any convenient means. One presently preferred technique involves prior preparation of a condensate of desired carboxylic acid material with a glycol material batch-wise. Typically the starting ingredients are heated to a temperature of from about 180° to 250° C (preferably from about 200° to 230° C) using heating times sufficient to remove substantially all of the water produced by condensation. A stream of nitrogen or other inert gas is preferably maintained through the apparatus during the heating procedure to maintain the reactants in an oxygen free environment. Preferably the resin is substantially comprised of 100 percent non-volatile resinous material.

Preferred starting ingredients are as indicated above, and preferably a starting resin has an APHA color of from about 50 to 200. Preferably also such a starting unsaturated polyester resin condensate has a utilizable average molecular weight as conveniently determined by measuring the viscosity in centipoises in a 70 weight percent solution in styrene, appropriate centipose values thus being in the range of from about 2200 to 2400.

Such an unsaturated polyester resin is then conveniently dissolved in the liquid vinyl monomer system. Preferably such liquid is prewarmed to a temperature in the range of from about 60° to 80° C in order to facilitate the dissolution therein of the starting unsaturated polester resin.

Preferably an inhibitor is initially dissolved in a starting liquid vinyl monomer system so as to prevent any undesirable or excessive polymerization or gelatin of a product solution of the unsaturated polyester resin in the vinyl monomer liquid. Many suitable inhibitors are known to the prior art. Examples of presently preferred suitable inhibitors include hydroquinone, methyl hydroquinone, and t-butyl catechol. A solution of such unsaturated polyester resin in such vinyl monomer is preferably inhibited with such a dissolved inhibitor. Conveniently and typically, the amount of inhibitor dissolved in a liquid vinyl monomer system initially or in a solution of such resin in such monomer ranges from about 50 to 500 parts per million (total liquid weight basis) with the amount of inhibitor preferably ranging from about 100 to 200 parts per million presently.

The amount of unsaturated polyester resin thus dissolved in the liquid vinyl monomer system typically and conveniently ranges from about 20 to 90 weight percent, and, more preferably, from about 50 to 70 weight percent initially. Commonly, such a concentrate may be further diluted with monomer at some time prior to final curing.

In accord with a preferred preparation procedure of this invention, a premix is made of at least one organoaluminum compound as described herein dissolved in a liquid vinyl monomer system as described herein. Conveniently and preferably the dissolution of organoaluminum compound in vinyl monomer is accomplished at temperatures from ambient to slightly elevated (e.g. temperatures in the range of from about 20° to 100° C) preferably using an inhibited liquid vinyl monomer system as above described. Conveniently and typically the amount of inhibitor used in a starting vinyl monomer or present in a product premix solution can range from about 15 to 500 parts per million (preferably 50 to 100 ppm). Any convenient method of achieving dissolution of organoaluminum compound in liquid vinyl monomer system can be employed as those skilled in the art will appreciate. Such a premix solution is a substantially anhydrous, non-Newtonian, storage stable composition.

The organoaluminum compounds employed in this invention may be incorporated, at any time prior to curing, into a liquid polyester resin which has been dissolved in a liquid vinyl monomer as described above. Particularly when inhibitors are employed as above described, such a concentrate, or such a concentrate with added monomer and organoaluminum compounds, is storage stable and can be shipped and sold as an item of commerce. Since it is usually desirable to further dilute the concentrate with monomer before curing, it is convenient to add the organoaluminum compounds as a premix solution in either part of or the entire quantity of the reserved monomer. As a matter of convenience, it is frequently easier to incorporate small quantities of materials in a premix and then to incorporate this premix into a mass. The quantity of monomer used in any given instance typically depends on whether further dilution by a given consumer is contemplated. Conveniently a premix solution may be added to a resin concentrate in a thinning tank at temperatures ranging from ambient to about 100° C, preferably temperatures ranging from ambient to about 60° C. A preferred liquid polester resin concentrate comprises on a 100 weight percent total composition basis A. from about 40 to 70 weight percent of an unsaturated polyester resin having a molecular weight ranging from about 100 to 30,000 and comprised of a condensate of at least one polyol with at least one polycarboxylated compound, B. from about 0.2 to 10 weight percent of at least one organoaluminum compound as described herein (but an amount which maintains the product composition in a liquid condition), and C. from about 30 to 60 weight percent of a liquid comprising at least one vinyl monomer having a molecular weight ranging from about 104 to 118 and having a boiling point greater than about 140° C.

The total quantity of inhibitor in such a concentrate conveniently falls in the range of from about 50 to 500 parts per million (total concentrate weight basis) and more preferably in the range of from about 100 to 200.

For example, typical liquid polyester resin compositions can be:

I. Unsaturated polyester resin as described above dissolved at about 70 to 75 weight % in inhibited monomer and with organoaluminum compound as described herein II. Unsaturated polyester resin dissolved about 60 weight % in inhibited monomer containing organoaluminum compounds;

III. Unsaturated polyester resin dissolved at about 45 weight % in inhibited monomer and containing organoaluminum compound; and the like.

In any of such typical exemplary compositions above, it is most convenient to add the organoaluminum compounds as a dissolved solution in that portion of liquid vinyl monomer used to dilute the non-volatile polyester resin from, for example, about 70 to 75% down to about 60% by weight. At 60% concentration, such a typical liquid polyester resin composition with incorporated organoaluminum compounds can comprise on a 100 weight percent total composition basis:

A. about 60 weight percent of an unsaturated polyester resin having a molecular weight ranging from about 1000 to 30,000 and comprised of a condensate of at least one polyol with at least one polycarboxylated compound;

B. from about 0.2 to 10 weight percent of at least one organoaluminum compound as defined above (such as one selected from the group consisting of aluminum alkoxides, aluminum alkenyloxides, aluminum aryloxides, aluminum alkoxyalkoxides, aluminum alkoxy (alkoxy)$_n$ alkoxides, aluminum acyloxides and aluminum chelates); and C. from about 35 to 40 weight percent of a liquid comprising at least one vinyl monomer as defined above (such as one having a molecular weight ranging from about 104 to 118 and having a boiling point greater than about 140° C).

The total quantity of inhibitor in such a concentrate preferably falls in the range of from about 50 to 500 parts per million (total concentrate weight basis) and more preferably in the range of from about 100 to 200.

Before use (e.g. curing or copolymerization), such a concentrate can be further diluted with additional quantities of liquid vinyl monomer system. Also, in order to achieve some desired viscosity additional quantities of organoaluminum compound can be dissolved in the concentrate (additional quantities of organoaluminum compound being preferably preliminarily dissolved in a liquid vinyl monomer system before being added to such a concentrate, as indicated above).

It is preferred to react ingredients when making a starting unsaturated polyester resin for use in the present invention in the presence of an inhibitor such as has been described herein, particularly an inhibitor such as hydroquinone. It is also preferred to have an inhibitor present at any time when the organoaluminum compound is heated with the unsaturated polyester resin in solution where the solvent is a vinyl monomer as described herein. Preferably, the temperatures of from ambient to about 60° C are employed when organoaluminum compounds are dissolved in monomer and preferably such temperatures are below about 38° C particularly when unsaturated polyester resin is present.

Organoaluminum compounds used in this invention have the unusual and perhaps unique ability to react with hydroxyl and carboxyl groups in the unsaturated polyester resin at room temperature under liquid phase (solution) conditions as explained herein. Upon addition of organoaluminum compound to a solution of unsaturated polyester resin in a liquid vinyl monomer system, three effects characteristically result. For one thing, terminal hydroxyl and carboxyl groups in the unsaturated polyester resin are blocked and thus are no longer available for reacting with water or other chemicals. Thus, for example, after organoaluminum compound in solution is admixed with polyester resin in solution at ambient temperature, a finite period of time at ambient temperature conditions is characteristically needed in order to produce a viscosity increase in the product mixed solution compared to, for example, the starting solution of polyester resin. Commonly a period of up to 48 hours is all that is needed typically for thickening to maximize, but sometimes this period may extend up to about 4 days. Warming at, for example, up to about 60° C for times up to about four hours can be used if desired to accelerate thickening to maximum value. The thickening is believed to result as hydroxyl and carboxyl groups in the resin molecules react with organoaluminum compounds, but there is no intent herein to be bound by theory. Organoaluminum compounds which are trifunctional as regards reactivity with ester carboxyl or hydroxyl groups can achieve greater increases in viscosity per unit of weight than is achieved with difunctional, and, to an even lesser extent, with monofunctional organoaluminum compounds.

For a second thing, the acid number of the starting unsaturated polyester resin is diminished. In general, the acid number of a given system is reduced from its theoretical value to a value which is about 30% of theoretical by the practice of this invention, the exact reduction depending upon the hydrolytic character of the acid number solvent. For example a normal 50/50 toluene/isopropanol acid number solvent shows a theoretical acid number reduction whereas an 80/20 toluene/isopropanol solvent shows an acid number reduction of 30% of theoretical by comparison.

For a third thing, a non-Newtonian liquid is produced upon the reaction of dissolved organoaluminum compound with solution of unsaturated polyester resin in liquid vinyl monomer system. The viscosity of this liquid is controllable based on the type and quantity of organoaluminum material added to a given solution of unsaturated polyester resin in liquid vinyl monomer system so that a viscosity value for a given solution which is desired for a particular lay-up operation or the like can be achieved.

Surprisingly and unexpectedly, in accordance with the teachings of this invention, relatively small amounts of dissolved organoaluminum compound added to a solution of unsaturated polyester resin in liquid vinyl monomer system produces a substantial change in the viscosity of the entire system. Owing to system variations caused by such inherent variables as type and amount of a starting unsaturated polyester resin, type and amount of vinyl monomer, molecular weight of resin, excess amount of polyol used, nature of the starting organoaluminum compound, and the like, it is not possible to give precisely an exact relationship between quantity of organoaluminum compound added and viscosity of final product liquid polyester resin composition, as those skilled in the art will readily appreciate. In general, however, addition of organoaluminum compound appears to increase the viscosity by a factor of from about 400 to 2500 centipoises when using preferred (as described above) unsaturated polyester resins of this invention in styrene (viscosity being measured by a Brookfield viscometer at a shear rate of from about 1.2 sec.$^{-1}$ at 25° C for a constant amount of glycol excess). Typically, and preferably the total amount of organoaluminum compound added to a liquid polyester resin composition dissolved in a liquid vinyl monomer system, even for purposes of concentrate manufacture, is less than about 2.0 weight percent (total solution weight basis) for the reason that at higher amounts the viscosity of the resulting liquid solution can reach levels which are excessive for purposes of general application conditions. However, higher concentrations of organoaluminum compound are sometimes desirable and are therefore within the scope and practice of this invention, as herein elsewhere indicated. Typically, a liquid concentrate polyester resin composition of this invention does not have a viscosity of more than about 8000 centipoises (measured by Brookfield viscometer at shear rates of 1.2 sec$^{-1}$ at 25° C), though the amount of organoaluminum compound added to a starting liquid polyester resin composition is never more than needed to maintain a product solution composition in a liquid (pourable) condition.

Figure 1:
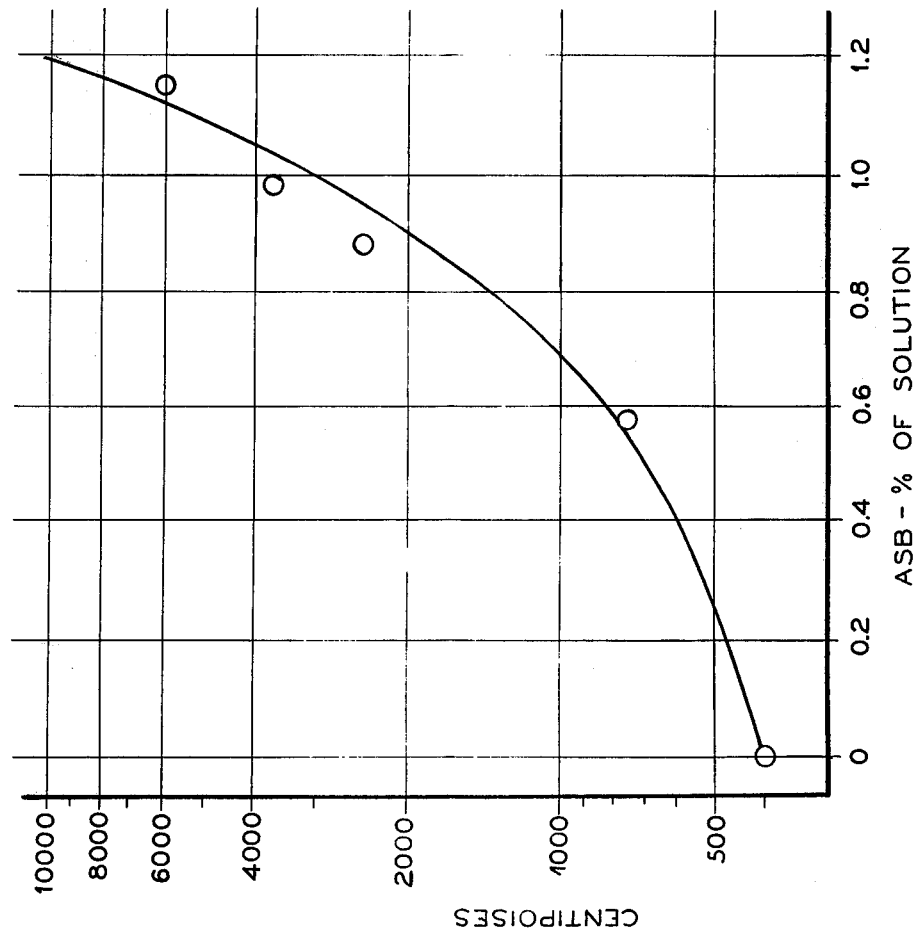
FIG. 1 illustrates in graphical form, for a liquid unsaturated polyester resin, the relationship between viscosity in centipoises as ordinates versus increasing amounts of an aluminum alkoxide added to an uninhibited solution of such polyester resin in styrene as abscissae.

The interrelationship between viscosity and quantity of organoaluminum compound present in a product liquid resin composition of this invention for one type of composition is illustrated in the accompanying FIG. 1 and in Examples 1 and 2 herein below. (See Examples below for description of details of FIG. 1).

Thus, the present invention provides a process for increasing and regulating the viscosity of a first solution comprising initially on a 100 weight percent basis from about 20 to 90 weight percent of an unsaturated polyester resin having a molecular weight ranging from about 1000 to 30,000 and comprised of a condensate of at least one polyol with at least one polycarboxylated compound and the balance up to 100 weight percent of any given such first solution being a liquid comprising at least one vinyl monomer having a molecular weight ranging from about 100 to 250 and having a boiling point greater than 100° C.

With such a first solution, one admixes a second solution comprising initially on a 100 weight percent basis from about 0.2 to 50 weight percent of at least one organoaluminum compound as defined above and the balance up to 100 weight percent of any given such second solution being said liquid vinyl monomer, and permitting the resulting mixed solution to age for a time sufficient to permit said resulting solution to increase in viscosity, the total quantity of said second solution so admixed with said first solution being such as to increase the final viscosity of said resulting solution to a desired extent.

Each of such first and such second solutions may, and preferably does have dissolved therein an inhibitor of the type and amount as hereinabove described.

Before a liquid polyester resin composition of this invention is copolymerized (e.g. cured), it is convenient and preferred for purposes of the present invention to have the relative weight percentages of unsaturated polyester resin, organoaluminum compound, and liquid vinyl monomer present fall within certain values. Vinyl monomer dilution of a starting resin concentrate may be necessary or desirable. Thus, a copolymerized liquid polyester resin composition before being cured preferably comprises on a 100 weight percent total composition basis A. from about 40 to 65 weight percent of an unsaturated polyester resin having a molecular weight ranging from about 1000 to 30,000 and comprised of a condensate of at least one polyol with at least one polycarboxylated compound, B. from about 0.2 to 10 weight percent of at least one organoaluminum compound as defined above (but the amount being not in excess of that needed for liquid phase maintenance), and C. from about 35 to 60 weight percent of a liquid comprising at least one vinyl monomer as defined above (e.g. one having a molecular weight ranging from about 100 to 250 and having a boiling point greater than about 100° C).

In such a composition, the total quantity of unsaturated polyester resin, as well as the total quantity of organoaluminum compound, are each substantially completely dissolved in the liquid vinyl monomer. In addition and before being cured, the product composition has a Brookfield viscosity of from about 500 to 7000 (preferably 1000 to 4000) measured at a shear rate of from about 1.2 sec.$^{-1}$ at 25° C. Furthermore, and also before being cured such a composition has a thix index of from about 1.1 to 7.5 (preferably 2 to 5) at 25° C. For purposes of the present invention, thix index can be defined as viscosity of liquid in Brookfield viscosimeter at a shear rate of 1.2 sec.$^{-1}$ at 25° C divided by viscosity of the same liquid in an ICI cone and plate viscometer measured at a shear rate of 10,000 sec.$^{-1}$ at 25° C. High shear rate is common during application, such as by spray gun and roller.

Compositions having such viscosity and thix index characteristics, as well as such respective quantities of unsaturated polyester resin, organoaluminum compound, and vinyl monomers, as above indicated, appear to produce cured resins having an optimum range of maximum physical properties. However, the exact physical property characteristics of any given cured polyester resin system derived from such a liquid polyester resin composition will vary with the type of polyester structure being used, percent of unsaturated acid, molecular weight of the polyester chain, and many other variables. Various other miscellaneous ingredients may be present in a starting liquid curable resin composition, as those skilled in the art will appreciate (usually less than, say, about 5 weight percent), and such ingredients can affect cured resin physical properties. Owing to the complexity of the chemistry involved, it is not possible to give any exact generalizations as to the physical and chemical characteristics which will be associated with any particular cured resin produced in accordance with the teachings of the present invention, as those skilled in the art will readily appreciate.

For example, when styrene is the vinyl monomer, there is generally an optimum range for maximum physical properties. This range will vary with the type of polyester structure being used, as indicated above. Flexible polyester resins with a very low unsaturated acid content generally require a rather high styrene dilution to develop an optimum tensile strength and to eliminate what would otherwise be a somewhat cheesy character. Polyesters with higher ratios of unsaturated acid generally require lower styrene contents (e.g. 20 to 40 weight percent styrene on a total weight basis) for maximum physical strengths. Beyond a certain point, additional styrene increases the brittleness (lowers the tensile elongation) and gives lower heat distortion temperatures. The ratio of molecular weight to equivalent weight can be used to indicate the number of unsaturated groups available for cross linking. Thus, styrene has one, diallylphthalate has two, triallylcyanurate has three, etc. The selection of monomers for a given liquid can be influenced by the properties desired in a product cured resin, such as low monomer volatility, flame resistance, weathering, heat resistance, or the like. Thus, for example, methyl methacrylate tends to result in a considerable improvement in weathering characteristics compared to cured resins made with styrene. However, methyl methacrylate, when used by itself as the cross-linking liquid monomer, has generally poor reactivity with unsaturated acids in a polyester chain which leads to an undesirably slow cure, and little, if any, improvement in weathering. It is, therefore, preferred to combine methyl methacrylate with styrene when making cured polyester resins of this invention, and, consequently when making a preferred class of copolymerizable liquid polyester resin product compositions of this invention.

If desired, and in accord with the teachings of this invention, one can utilize in a copolymerizable liquid polyester resin composition (unsaturated polyester dissolved in vinyl monomer) a quantity of fumed silica in combination with organoaluminum compound.

The liquid polyester resin compositions of this invention characteristically exhibit typical non-Newtonian flow properties, that is, the liquid composition of this invention have a viscosity which is dependent on the rate of shear applied thereto. Thus, a liquid composition of this invention characteristically does not decrease in viscosity until the force exerted thereon is increased. The increase in viscosity with increasing shear rate associated with liquid compositions of this invention usually varies from one composition to another, depending upon the components thereof and other variables. Typically, liquid compositions of this invention which are ready for curing have a thix index in the range indicated, though, as those skilled in the art will appreciate, the thix index can sometimes be smaller or larger than this range in an individual situation.

Converting a liquid polyester resin composition of this invention into a solid state involves a copolymerization reaction which utilizes a free radical mechanism and affects double bonds in the polyester chain. Characteristically, such a copolymerization reaction is initiated by thermal activity, light of various wave lengths, and/or initiators. Initiators introduced into a liquid polyester resin decompose into highly active free radicals which act to seed the free radical reactions involved and produce subsequent polymerization throughout the entire system. As used herein, the term "initiator" has reference to a substance which when added to a polymerizable resin composition of this invention appears to promote addition polymerization.

Preferred initiators for use in the practice of the present invention are peroxides. One group of suitable peroxides comprise diacyl peroxides, such as benzoyl peroxide, lauroyl peroxide, 2,4-dichloro benzoyl peroxide, p-chlorobenzoyl peroxide, and the like. Another suitable class comprises ketone peroxides, such as methyl ethyl ketone peroxide, and the like. Another suitable class comprises aldehyde peroxides, such as hydroxy heptyl peroxide, and the like. Another class comprises alkyl peresters, such as di-t-butyl diperphthalate, t-butyl perbenzoate, and the like. Another suitable class comprises alkyl hydroperoxides, such as t-butyl hydroperoxide, and the like.

The primary consideration in selecting an initiator for curing a polyester resin composition of this invention is generally the temperature at which the curing process is to be carried out. As is conventional in the curing of polyester resins generally, after an initiator has been added to a resin system, the curing process starts as soon as the initiator breaks down into active free radicals. Such a break down is accomplished by heating a system of this invention to a temperature at which the particular initiator employed decomposes at a fairly rapid rate.

Alternatively, decomposition of initiator can be accomplished at lower temperatures by the use of accelerators and/or promotors which serve to decompose the initiator in any given instance to free radicals about as rapidly as in normal thermal decomposition.

Unless an inhibitor (present in a starting liquid resin composition of this invention at the time of curing) decomposes with increasing temperature, the initial free radicals are characteristically initially consumed by reacting with the inhibitor. In addition to regulating storage stability of a liquid resin composition of this invention, an inhibitor may be used to lengthen the liquid state time so as to permit a limited or controlled additional flow of a resin composition of this invention after lay up or the like before a given composition gels.

As indicated above, the concentration of inhibitor in a system of this invention is preferably low and the inhibitor is preferably rapidly consumed by an equivalent portion of initiator.

Because a polyester system (composition) of this invention is characteristically made up of molecules containing reactive centers which are already apparently somewhat partially cross linked by means of its organoaluminum compound and which system is further cross linked by its vinyl monomer at the time of curing, it takes characteristically relatively little additional cross linking to set up a three-dimensional molecular network in an initially liquid resin composition of this invention which converts such liquid into a gel structure. Typically, in curing a liquid composition of this invention, there does not appear to be a gradual increase in liquid viscosity which finally results in a gel or solid polymer. Development of a fully cross-linked polymer product proceeds from (after) the formation of a gel structure. The rate of gelation of a liquid polyester resin system of this invention is apparently proportional to the initiator concentration and inversely proportional to the inhibitor concentration. Increased quantities of inhibitor apparently tend to shorten gel time while increased quantities of inhibitor apparently lengthen it.

As used herein, the term "inhibitor" has reference to a substance which, when added to a polymerizable resin composition of this invention, appears to provide storage stability therefor by consuming free radicals before they can initiate any copolymerization and to control the polymerization process once it has started.

In general, promoters and accelerators are compounds which speed the decomposition of initiator material into free radicals at room temperatures, or at temperatures considerably below those characteristically required to release free radicals when initiator alone is used.

As used herein the term "promoter" refers to a substance or substances which, when added to a polymerizable resin composition of this invention with one or more initiators appears to promote cross-linking at ambient temperatures thereby avoiding the use of applied heat to effectuate a resin cure. Presently preferred promoters are cobalt naphthenate and cobalt octoate.

As used herein, the term "accelerator" refers to a substance or substances which, when added to a polymerizable resin composition of this invention with one or more initiators appears to speed up (shorten) curing time at given curing conditions (optional for ambient cure). A presently most preferred accelerator is dimethyl aniline.

Preferred accelerators are selected from the group consisting of heavy metal salts of aromatic monocarboxylic acids, alkyl substituted anilines, quaternary amines containing from 4 to 15 carbon atoms per molecule (preferably 8 to 10 carbon atoms per molecule), and aliphatic monomeric mercaptans containing from 5 to 18 carbon atoms per molecule (preferably 12 to 16 carbon atoms per molecule).

In one preferred mode of curing a liquid resin composition of this invention, there is added to such a composition and admixed therewith a curing composition immediately prior to the time when curing of such a solution is to be effected. Such a curing composition comprises, on a 100 weight percent total product mixture basis (that is, including the solution with which the curing composition is admixed):

A. from about 0.5 to 2 weight percent of at least one initiator,
B. from about 0.2 to 2.0 weight percent of at least one promoter,
C. from 0 to about 0.5 weight percent of at least one accelerator, and
D. from about 50 to 500 parts per million of at least one inhibitor.

After addition of such a curing composition to such a liquid solution of this invention, curing is effectuated. Curing conditions and materials are similar to those employed with prior art liquid unsaturated polyester resins. Two or more different types of curing compositions may be employed under use conditions, such as one for ambient temperatures and another for elevated temperatures. Double accelerator systems may be employed.

In general, liquid polyester resin compositions of this invention are used similarly to polyester liquid resin compositions known to the prior art. Glass fibers (e.g., roving or premixed chopped glass) and glass cloth can be used for reinforcement using the teachings of the prior art, for example, in addition to reinforcing agents, resins of this invention can be compounded with extenders, plasticizers, flame retardants, coloring pigments, thixotropic agents, and the like. In addition to glass fibers (some bonding my occur between such glass and resins of this invention), one may use, for examples, fibers of sisal, asbestos, cotton, wood, metals, or the like. Pigment fillers include inorganic, metallic and organic systems. See, for glass filled resins, ASTM C-581, paragraph 5.1.2.1.

Compared to prior art cured polyester resin compositions of the present invention have improved chemical resistance which is attributed to the presence of organoaluminum compounds in such cured resins as taught in the present invention. The improved chemical resistance associated with cured polyester resin compositions of the present invention can be demonstrated by the structural strength characteristics associated with such cured products even after prolonged boiling in distilled water. Thus, a test for chemical resistance of thermosetting resins is provided (ASTM test, No. C 581.68) and can be employed to evaluate and test resins of this invention. Also, a test for accelerated weathering is provided in ASTM test No. E 42 and such can be employed for resins of this invention. Further, an ASTM test designated No. D-1435-65T for outdoor weathering may be used to test resins of this invention.

In place of, or alternatively, the cloudy benzene test described above as item (7) in the characterization of properties associated with organoaluminum compounds useful in the practice of the present invention, one can employ a procedure such as follows: Dissolve phthalic acid in styrene to form a 1 weight percent (100 weight percent total basis) solution thereof (termed solution A). Independently dissolve a given organoaluminum in styrene to form a 5 weight percent solution thereof (100 weight percent basis) termed solution (B). Mix solution B with solution A at 25° C at the weight ratio of 1 : 1 solution A:solution B (making solution C). Then measure the acid number using 50/50 toluene/isopropanol for each of solutions A and C, respectively, at 25° C. If the acid number of solution C is 25 percent less than that for solution A, then the particular organoaluminum compound is usable in the practice of this invention.

EMBODIMENTS

The present invention is further illustrated by reference to the following examples. Those skilled in the art will appreciate that other and further embodiments are obvious and within the spirit and scope of this invention from the teachings of these present examples taken with the accompanying specification.

The following examples illustrate preparation of polyester resins useful in the practice of the present invention.

EXAMPLE A

A mixture of the following starting materials is placed in a reactor:

propylene glycol 950 parts by weight
phthalic anhydride 881 parts by weight
maleic anhydride 583/2414 parts by weight The propylene glycol and the phthalic anhydride are premixed and heated to 135° C when the maleic anhydride is added in molten form.

This resulting mixture is heated in the reactor to a temperature of about 200° C until the theoretical water is removed (about 12 hours). During the heating, a stream of nitrogen is maintained through the apparatus. Details are provided in Table I below. The yield is approximately 2200 parts by weight of resin. The resulting resin has an APHA color of 25. Also the product resin has a Gardner-Holdt viscosity in 30 weight percent styrene solution of Z, or 2300 centipoises at 25° C.

The final acid number of the 100 weight percent non-volatile resin product is 24. The "final acid number" is determined by titration of a 5 gram sample of final resin dissolved in 50/50 toluene/isopropanol mixture, titrating to end point with bromthymol blue using 0.1N alcoholic KOH. Calculation is as follows:

$$\frac{cc\ 0.1N\ KOH \times 5.61}{grams\ solid\ resin} = acid\ number.$$

The product resin is cooled to about 160° C and then is slowly added with mixing to styrene which is pre-warmed to about 70° C. and which contains dissolved therein preliminarily 140 parts per million (based on total weight of styrene plus resin) of methyl hydroquinone. About 943 grams of styrene is employed. Solution temperature is held to 95° C maximum. The resulting solution is cooled to room temperature and comprises 70 weight percent total weight basis non-volatile resin. The results are summarized in Table II below.

Table I

| | Reaction Data -- Preparation of unsaturated polyester resin. Example A. | | | | | | |
|---|---|---|---|---|---|---|---|
| Elapsed Total Time | Pot ° C | O'h'd. ° C[1] | H₂O,cc[2] | N₂Rate[3] | AN[4] | Vis.[5] | Remarks |
| 0:00 | 21 | 21 | - 0 - | 0.05 | | | 100 V. |
| 0:05 | 23 | 21 | - 0 - | 0.002 | | | none |
| 0:30 | 105 | 28 | - 0 - | 0.002 | | | none |
| 0:40 | 130 | 32 | - 0 - | 0.05 | | | Add molten MA |
| 0:45 | 135 | 39 | - 0 - | 0.002 | | | None |
| 1:00 | 191 | 100 | 49 | 0.002 | | | Trying to foam over. Low stir. 70 V. |

Table I-continued
Reaction Data -- Preparation of unsaturated polyester resin. Example A.

| Elapsed Total Time | Pot ° C | O'h'd. ° C[1] | H₂O,cc[2] | N₂Rate[3] | AN[4] | Vis.[5] | Remarks |
|---|---|---|---|---|---|---|---|
| 1:30 | 198 | 97 | 97 | 0.002 | | | 7cc. H₂O insol. |
| 2:00 | 199 | 131 | 95 | 0.03 | | | Stir at 45. |
| 2:30 | 199 | 91 | 155 | 0.03 | | | None |
| 3:00 | 200 | 76 | 167 | 0.05 | | | None |
| 3:30 | 200 | 69 | 176 | 0.05 | | | None |
| 4:00 | 198 | 66 | 184 | 0.05 | | | None |
| 4:30 | 200 | 62 | 190 | 0.05 | | | None |
| 5:00 | 200 | 58 | 194 | 0.05 | | | None |
| 5:30 | 200 | 56 | 197 | 0.05 | | | Unplugged cond. |
| 6:00 | 199 | 55 | 198 | 0.05 | 53 | U+ | #1 |
| 6:30 | 200 | 50 | 200 | 0.05 | | | Changed to Allihn Cond. |
| 7:00 | 199 | 47 | 202 | 0.05 | 43 | U+ | #2 |
| 7:30 | 199 | 42 | 204 | 0.05 | | | None |
| 8:00 | 199 | 42 | 205 | 0.05 | 39 | V+ | #3 |
| 8:30 | 199 | 41 | 207 | 0.05 | | | None |
| 9:00 | 200 | 39 | 208 | 0.05 | 36 | V — W | #4 |
| 9:30 | 200 | 38 | 209 | 0.05 | | | None |
| 10:00 | 200 | 36 | 210 | 0.05 | 33 | W+ | #5 |
| 10:30 | 199 | 35 | 211 | 0.05 | | | None |
| 11:00 | 200 | 34 | 212 | 0.05 | 31 | X— | #6 |
| 11:30 | 200 | 32 | 212 | 0.05 | | | None |
| 12:00 | 200 | 32 | 212 | 0.05 | 28 | Y — Z | #7 |
| 12:10 | 145 | 32 | 212 | 0.02 | | | Drop Mantle |

Table I footnotes
[1]Overhead temp. at top of steam heated condenser.
[2]Water of reaction collected in total condenser.
[3]Nitrogen rate passed through resin, cubic feet per minute per gallon.
[4]Acid number of 100% solid resin in mg. KOH/gm resin.
[5]Viscosity at 70% non-volatile resin in 30% styrene.

EXAMPLE B

The procedure of Example A is repeated except that (a) the reactor temperature is maintained at about 230° C during theoretical water removal and (b) about 0.33 gm hydroquinone is added at the start of reaction (150 ppm based on 2200 gm yield). Product resin properties are substantially identical to those described as Example A above.

The final resin is similarly dissolved in styrene by the procedure described in Example A above and the product solution is cooled to room temperature. The results are summarized in Table II below.

EXAMPLE C

The procedure of Example A is repeated except that the product is dissolved in 733 gms styrene to produce a product containing 75 weight percent non-volatile resin. The results are summarized in Table II below.

EXAMPLE D

The procedure of Example B is repeated except that here the product is dissolved in 733 gms styrene to produce a product containing 75 weight percent non-volatile resin. The results are summarized in Table II below.

Table II

| Example Designation | Parts by wt. propylene glycol | Parts by wt. phthalic anhydride | Parts by wt. maleic anhydride | ppm hydroquinone | ° C temp. of condensation | APHA color | final acid No. | Parts by wt. styrene used as solution |
|---|---|---|---|---|---|---|---|---|
| A | 950 | 881 | 583 | — | 200 | 25 | 25 | 943 |
| B | 950 | 881 | 583 | 150 | 230 | 160 | 25 | 943 |
| C | 950 | 881 | 583 | — | 200 | 25 | 25 | 733 |
| D | 950 | 881 | 583 | 150 | 230 | 160 | 25 | 733 |

| Example Designation | Solution concentration in styrene (weight %) | Inhibitor type | amount in styrene solution (ppm) | Viscosity Gardner Holdt poises at 25° C |
|---|---|---|---|---|
| A | 70 | methyl hydroquinone | 130 | 23 |
| B | 70 | methyl hydroquinone | 130 | 23 |
| C | 75 | methyl hydroquinone | 140 | 100 |
| D | 75 | methyl hydroquinone | 140 | 100 |

The following examples illustrate preparation of organoaluminum compound solutions.

EXAMPLE E

As a control 524 grams of inhibited styrene are added at ambient temperature to Example A styrene solution of unsaturated polyester resin to produce a solution in styrene of 60 weight percent non-volatile resin. The results are summarized in Table III and IV below.

EXAMPLE F

Aluminum tri-sec-butoxide is pre-mixed with styrene at ambient temperature to produce a pre-mix containing 524.0 parts by weight of styrene and 21.3 parts by weight of aluminum tri-sec-butoxide to produce a solution containing about 96.1 parts by weight of styrene and 3.9 parts by weight of aluminum tri-sec-butoxide. The results are summarized in Table III below.

EXAMPLE G

The procedure of Example F is repeated except that 33.0 parts by weight of aluminum tri-sec-butoxide are added to produce a product solution containing about 5.9 weight percent of such aluminum compound. The results are summarized in Table III below.

EXAMPLE H

The procedure of Example F is repeated except that 36.7 parts by weight of aluminum tri-sec-butoxide are added to produce a product solution containing about 6.5 weight percent of such aluminum compound. The results are summarized in Table III below.

EXAMPLE I

The procedure of Example F is repeated except that 733 parts by weight of styrene and 42.9 parts by weight of aluminum tri-sec-butoxide are added to product a produce solution containing about 5.5 weight percent of such aluminum compound. The results are summarized in Table III below.

It is noted that organoaluminum compounds such as aluminut tri-sec-butoxide or aluminum isopropoxide are preferably kept below about 7 weight percent concentration by weight in the styrene solution pre-mix in order to avoid the possibility of forming lumps during mixture thereof with resin solution. This can be achieved by, in effect, borrowing some styrene from the resin solution to use with the aluminum compound. For example, one can use a 75 weight percent non-volatile resin instead of a 70 weight percent polyester resin solution in monomer to give more styrene for use with the organoaluminum compound.

TABLE III

ORGANOALUMINUM SOLUTION PREPARATION

| Example Designation | Organoaluminum Cpd. Type | Amt. (wt.%) | solvent | Inhibitor Type | Amt. (ppm) |
|---|---|---|---|---|---|
| E | (control) | | styrene | t-butyl catechol | 50 |
| F | aluminum tri sec butoxide | 3.9 | " | " | " |
| G | " | 5.9 | " | " | " |
| H | " | 6.5 | " | " | " |
| I | " | 5.5 | " | " | " |

EXAMPLES J - DD

Each of the organoaluminum compounds listed in Table VII is dissolved in 524 grams of inhibited styrene. If necessary, the styrene is heated to 60°-70° C to effect solution.

A weight of organoaluminum compound used is such that the weight of each respective such aluminum compound in 524 gms of styrene solution is the percentage indicated times 3667.0 gm.

EXAMPLES EE - KK

Each of the organoaluminum compounds listed in Table VIII is dissolved in 1684 gm inhibited styrene. If necessary, the styrene is heated to 60°-70° C to effect solution. A weight of organoaluminum compound used is in each instance such that its weight in 1684 gm styrene would be the percentage indicated in Table VIII times 4783.0 gm.

The following Examples illustrate liquid polyester resin compositions of the present invention

EXAMPLE 1

The solution of Example F (above) is added to the solution of Example A (above) with vigorous stirring resulting in a product solution containing:

| | | |
|---|---|---|
| 2200 | gm | NVR (non-volatile resin of Ex. A) |
| 1467 | gm | Styrene (inhibited) |
| 3667 | gm | (subtotal) |
| 21.3 | gm | ASB (0.58% of the resin system) |
| 3688.3 | gm | (total) |

"ASB" designates aluminum tri-sec-butoxide. This product solution has a Brookfield viscosity of about 740 cps at a shear rate of about 1.2 sec −1 at 25° C. In addition, this composition has a thix index of about 1.3 at 25° C. Also, this product composition contains about 112 ppm of methyl hydroquinone as an inhibitor (total 100 weight percent basis). Details are summarized in Table IV below.

EXAMPLE 2

The solution of Example G (above) is added to the solution of Example A (above) with vigorous stirring resulting in a product solution containing:

| | | |
|---|---|---|
| 2200 | gm | NVR (non-volatile resin of Ex. A) |
| 1467 | gm | Styrene (inhibited) |
| 3667 | gm | (subtotal) |
| 33 | gm | ASB (0.9% of the resin system) |
| 3700 | gm | (total) |

ASB designates aluminum tri-sec-butoxide. This product solution has a Broodfield viscosity about 2400 cps at a shear rate of about 1.2 sec −1 at 25° C. In addition, this composition has a thix index of about 3.1 at 25° C. Also, this product composition contains about 112 ppm of methyl hydroquinone as an inhibitor (total 100 weight percent basis). Details are summarized in Table IV below.

EXAMPLE 3

The procedure of Example 1 is repeated except that here the solution of Example H is added to the product of Example A. Details are summarized in Table IV below.

EXAMPLE 4

The procedure of Example 1 is repeated except that here the solution of Example 1 is added to the product of Example C. Details are summarized in Table IV below.

After storage, the compositions of Examples 1 through 4 above are evaluated for their viscosity in centipoises by Brookfield LVF, 3 spindle at 6 RPM and the results are shown below in Table IV and in FIG. 1 attached. The results show that the optimum level of using aluminum tri-sec-butoxide in this particular system appears to be about 0.9 weight percent; however, a useful range is at about the 0.5 to 1.5 weight percent level of aluminum tri-sec-butoxide in a solution of polyster resin in styrene. The level of 0.9 weight percent aluminum tri-sec-butoxide produces substantially the same viscosity as obtained with 1.0 weight percent fumed silica. (See Example 7 below).

In each of the compositions of respective Examples 1 through 4, the aluminum tri-sec-butoxide produces a predictable viscosity increase at room temperature apparently by cross linking between hydroxyl and carboxyl groups. The degree of cross linkage is adequate to produce viscosity increases compared to starting compositions containing substantially no aluminum secondary butoxide. A storage stable non-Newtonian liquid is produced in each instance without causing production of a semi-solid gel.

The non-Newtonian viscosity increase is desirable to prevent running and sagging of the polyester during application thereof, such as in lay-ups with glass fiber in making tanks or boats. In addition, this viscosity increase also serves as a valuable tool for adjusting completed resins to a desired viscosity, a process which cannot be accomplished in the prior art.

Details are summarized in Table IV below. The data in Table IV with respect to weight percent organoaluminum compound, and viscosity behaviour in centipoises, is plotted, as respectively, abscisa and ordinates, and the results are shown in FIG. 1. These results demonstrate that increasing amounts of aluminum-tri-sec butoxide systematically increases progressively Brookfield viscosity in centipoises of an unsaturated polyester resin.

num tri-sec-butoxide combines with terminal hydroxyl and carboxyl groups and blocks same so that they are no longer available.

When these acid numbers are rerun using the same styrene solution of polyester and aluminum sec-butoxide but employing in place of the 50/50 toluene/isopropanol solvent an 80/20 toluene/isopropanol acid number solvent, an acid drop of approximately 5 is obtained with no precipitate. The difference in acid number is believed attributable to partial cross linking with aluminum secondary butoxide resulting in insolubility in the 50/50 toluene/isopropanol solvent, whereas the more hydrophobit 80/20 toluene/isopropanol solvent dissolves the aluminum sec-butoxide partially cross linked resin. Since most of the corrosive media which polyesters must withstand are hydrophylic aqueous solutions, this acid number work indicates why polyester resins with aluminum sec-butoxide (and other organoaluminum compounds) as employed in the practice of the present invention show improved chemical resistance.

TABLE V

| Example Designation | ACID NUMBERS | |
|---|---|---|
| | Acid Number | |
| | A | B |
| E | 25.3 | 25.4 |
| 5 | 11.3 | 19.9 |

"A" designates acid numbers determined using 50/50 toluene/isopropanol solvent
"B" designates acid numbers determined using 80/20 toluene/isopropanol solvent

TABLE IV

LIQUID RESIN COMPOSITIONS WITH ORGANOALUMINUM COMPOUND

| Example Designation | Resin Solution | | Organo-aluminum Solution | | Product Resin Composition | | | Time lapse before max. viscosity measured (ambient cond.)** | (cps) Max viscosity (Brookfield) shear rate & temp.* | Thix Index |
|---|---|---|---|---|---|---|---|---|---|---|
| | Example Designation | Amount wt. % | Example Designation | Amount wt. % | Wt. % Resin | Wt. % Organo-aluminum | Wt. % styrene | | | |
| E | E | 100.0 | — | — | 60.0 | 0.00 | 40.00 | 0 hr. | 400 | 0.8 |
| 1 | A | 85.3 | F | 14.7 | 59.65 | 0.58 | 39.77 | 48 hr. | 740 | 1.3 |
| 2 | A | 84.9 | G | 15.1 | 59.46 | 0.89 | 39.65 | 48 hr. | 2400 | 3.3 |
| 3 | A | 84.9 | H | 15.1 | 59.40 | .99 | 39.61 | 48 hr. | 3600 | 4.6 |
| 4 | C | 79.1 | I | 20.9 | 59.30 | 1.16 | 39.54 | 48 hr. | 6000 | 6.9 |

*1.2 sec$^{-1}$ at 25° C.
**Maximum viscosity develops in a time interval which is not greater than 4 hours at 60° C.

EXAMPLE 5

Acid numbers are run on a styrene solution of unsaturated polyester and aluminum tri-sec-butoxide. This solution is prepared by admixing Examples C and I above; such solution comprises 60% of mol ratio one/one/2.1 phthalic anhydride/maleic anhydride/propylene glycol unsaturated resin in a 40 weight percent styrene solution with and without aluminum sec-butoxide added to the extent of about 1.16 weight percent of total solution weight. Acid numbers are run by standard titration to bromthymol blue end point with 0.1N alcoholic KOH with a standard 50/50 toluene/isopropanol solvent. The results are summarized in Table V below.

The information developed indicates that the acid numbers show significant decrease with increasing amounts of aluminum sec-butoxide. For example, a decrease in acid number of 14 (from 25 to 11) for Example No. 5 compared to Example E is shown. This 14 acid number drop corresponds approximately to the theoretical acid number drop if the aluminum sec-butoxide reacts with the carboxylic acid groups present in the liquid polyester resin used. The solutions used in determining acid number show greater than normal precipitation during titration apparently caused by slight cross linking. The results indicate that the alumi-

EXAMPLE 6

Liquid resin compositions of Examples E, 1 and 4 are each copolymerized by admixing therewith a curing composition which comprises (on a 100 weight percent total resin composition basis):

| Component Type and Identity | | | amt.(total basis) | |
|---|---|---|---|---|
| | | | wt. % | PPM |
| peroxide | initiator | methylethyl ketone peroxide 60% | 1.0 | |
| | promotor | cobalt naphthenate 6% | 0.2 | |
| | accelerator | dimethyl aniline | 0.1 | |
| | inhibitor | methyl hydroquinone | | 112 |
| | | t-butyl catechol | | 300 |

The resulting system is formed into coupons each measuring b 5 by 5 by ⅛ inch and allowed to cure 1 hour. Before cure, excellent stay-put characteristics are observed. The product cured resin in each case in a hard, clear material displaying excellent physical strength characteristics. Results are summarized in Table VI below. Curing is accomplished at ambient temperatures and pressures.

EXAMPLE 7

Representative samples, each measuring 5 × 5 × ⅛ inch of cured resins, as prepared in Example 6, are placed in distilled water and then boiled for 24 and 48 hours, respectively, after which flexural strength measurements in SPI of boiled samples are made according to ASTM D-790. The results are summarized below in Table VI and also are shown graphically in FIG. 2. The results show increased water stability (better chemical resistance) for resins containing organoaluminum compounds compared to an untreated control (derived from Example E) and to a fumed silica filled resin of the prior art type.

This fumed silica filled resin is prepared using 2200 grams of the 100 weight percent non-volatile resin of Example A diluted with 1467 grams of inhibited styrene. To this solution with vigorous stirring is added 36.7 grams of fumed silica and 3.7 grams of glycerol. This product which as a viscosity of 2400 centipoises at 25° C (Brookfield at a shear rate of 1.2 sec$^{-1}$) within 24 to 48 hours at ambient conditions is then sampled and cured at ambient temperatures into a sample of size as above indicated for 24 hours, curing being accomplished using the curing composition of Example 6.

The data appearing in Table 6 are plotted in FIG. 2. Each of the Examples in Table 6 is designated by a Roman numeral and such Roman numeral designation is used to identify the respective plot lines for the indicated resins in FIG. 2.

TABLE VI
CHEMICAL RESISTANCE TESTS

| Strength | Ex. No. E (Control) | Ex. No. 7 Resin Filled with fumed silica | Ex. No. 1 (with 0.58% ASB) | Ex. No. 4 (with 1.16% ASB) |
|---|---|---|---|---|
| Flex. Strength PSI | | | | |
| Initial | 14,700 | 13,600 | 15,600 | 15,000 |
| 24 Hr. Boil | 6,630 | 3,540 | 9,260 | 9,340 |
| 48 Hr. Boil | 3,550 | 3,150 | 4,200 | 4,710 |
| Flex. Mod. PSI × 10$^5$ | | | | |
| Initial | 6.2 | 6.7 | 6.3 | 6.1 |
| 24 Hr. Boil | 5.4 | 4.9 | 5.3 | 5.4 |
| 48 Hr. Boil | 4.6 | 3.7 | 4.7 | 4.7 |
| Barcol Hardness | | | | |
| Initial | 48 | 50 | 48 | 49 |
| 24 Hr. Boil | 42 | 42 | 43 | 45 |
| 48 Hr. Boil | 39 | 33 | 40 | 41 |
| Curve identification in FIG. 2. | III | IV | II | I |

EXAMPLE 8 – 28

Organoaluminum solutions in styrene in Examples J-DD above are incorporated at various respective concentrations with vigorous stirring into a commercially available resin and the viscosity of each resulting liquid is determined.

The resin used is a liquid unsaturated polyester resin system available commercially under the trademark Paraplex P-43 from Rohm & Haas Co., Philadelphia, Pa.

| Typical properties of this resin are: | |
|---|---|
| Styrene monomer content | 30% |
| Polyester concentration | 70% |
| Viscosity (25° C) Centipoises | 2500 |
| Color-APHA | 100 |
| Specific Gravity (25° C) | 1.148 |
| Refractive Index N$^D$, 25° | 1.5362 |
| Acid Number | 35 |

Other characteristics of the resin are shown in Rohm & Haas Product Bulletin No. PL-442a.

The results are summarized below in Table VIII.

The procedure in each instance is as follows 3135 gm portions of Paraplex P-43 are warmed to 60° C. and a premix from respective Examples J-DD is added with good agitation. Agitation is continued for 10 minutes although agitation during the entire thickening development time is advantageous. The 60° temperature is maintained for 4 hours. Experience shows that there is apparently no more thickening after this length of time. The experimental results are recorded in Table VII. The resin is cooled and viscosity determinations are made at 25° C. The entries represent a low shear measurement/slightly higher shear measurement, all determined with a Brookfield LVF Viscometer, first using a 3 spindle at 6 RPM and then using a 3 spindle at 60 RPM. The formulation in each instance is thus:

| | |
|---|---|
| 2200 gm Non-Volatile Unsaturated Paraplex P-43 Polyester Resin | = 60% |
| 1467 gm Styrene - inhibited | = 40% | as called for Organoaluminum compound.

(Alternatively the premix may be added at ambient temperatures in which case it takes several hours to a few days to develop full viscosity.)

Each of the product systems is conventionally curable with peroxide initiators to a solid resin with excellent physical and chemical properties.

TABLE VII
COMMERCIALLY AVAILABLE RESIN PLUS ORGANOALUMINUM COMPOUND
Paraplex P-43 -60% NVR -Viscosity at 0% Al = About 400 -

| Resin Example Number | Aluminum Derivative | Solution Example Number | 0 | .6% | .8% | 1.0% |
|---|---|---|---|---|---|---|
| 8 | Aluminum Trimethoxide | J | | 450/365 | | |
| 9 | Aluminum Triethoxide | K | | | | |
| 10 | Aluminum Triisopropoxide | L | 500/355 | 550/415 | 500/400 | 550/455 |
| 11 | Aluminum Triisopropoxide | M | | 450/350 | 550/405 | 650/530 |
| 12 | Aluminum n-Butoxide | N | | 500/400 | 500/360 | 550/385 |
| 13 | Aluminum sec-Butoxide | O | 500/420 | 550/450 | 600/475 | 750/520 |
| 14 | Aluminum sec-Butoxide | P | 450/370 | 500/440 | 500/410 | 500/400 |
| 15 | Aluminum ter-Butoxide | Q | | 550/400 | 500/385 | 550/410 |
| 16 | Al (OiPr)$_2$ (OCH$_2$CH$_2$OCH$_3$) | R | | | | 900/860 |
| 17 | Al (OiPr)$_2$ (OCH$_2$CH$_2$OCH$_3$) | S | | 600/500 | 650/530 | 750/565 |
| 18 | Al (OiPr)$_2$ OCH$_2$CH$_2$OC$_4$H$_9$) | T | | 500/400 | 600/450 | 650/510 |
| 19 | Al (OCH$_2$CH$_2$OCH$_3$)$_3$ | U | | 550/460 | 550/440 | 750/655 |
| Resin Example | Aluminum | Solution Example | | | | |

TABLE VII-continued

COMMERCIALLY AVAILABLE RESIN PLUS ORGANOALUMINUM COMPOUND
Paraplex P-43 -60% NVR -Viscosity at 0% Al = About 400 -

| Number | Derivative | Number | 1.2% | 1.4% | 1.5% | 1.6% | 1.7% | 1.8% | Temp. |
|---|---|---|---|---|---|---|---|---|---|
| 8  | Aluminum Trimethoxide       | J |         |           |         | 500/370   |  |           | 60°   |
| 9  | Aluminum Triethoxide        | K |         |           |         |           |  | 500/360   |       |
| 10 | Aluminum Triisopropoxide    | L | 600/500 | 850/710   |         | 900/780   |  |           | 60° C |
| 11 | Aluminum Triisopropoxide    | M | 900/720 | 1000/880  |         | 1900/1710 |  |           | 25° C |
| 12 | Aluminum n-Butoxide         | N | 550/380 | 600/465   |         | 600/465   |  |           | 60°   |
| 13 | Aluminum sec-Butoxide       | O | 700/570 | 800/650   |         | 900/770   |  |           | 60°   |
| 14 | Aluminum sec-Butoxide       | P | 600/500 | 700/600   |         | 850/790   |  |           | 25°   |
| 15 | Aluminum ter-Butoxide       | Q | 600/460 | 650/510   |         | 700/600   |  |           | 60°   |
| 16 | Al (OiPr)₂ (OCH₂CH₂OCH₃)    | R |         |           |         |           |  | 3550/off  |       |
| 17 | Al (OiPr)₂ (OCH₂CH₂OCH₃)    | S | 750/620 | 1000/915  |         | 1300/1170 |  |           |       |
| 18 | Al (OiPr)₂ OCH₂CH₂OC₄H₉)    | T | 650/480 | 750/620   |         | 1000/840  |  |           | 60°   |
| 19 | Al (OCH₂CH₂OCH₃)₃           | U | 750/660 | 1000/845  |         | 1500/1120 |  |           |       |

| Resin Example Number | Aluminum Derivative | Solution Example Number | 0 | .6% | .8% | 1.0% |
|---|---|---|---|---|---|---|
| 20 | Aluminum Triacetylacetonate          | V  |         |         | 500/400 |
| 21 | Aluminum Isopropoxide Dilinoleate    | W  | 650/540 | 600/535 | 325/500 |
| 22 | Aluminum Diisopropoxide Phenoxide    | X  | 500/370 | 500/410 | 550/420 |
| 23 | AlP with 2% Propylene Glycol         | Y  |         |         |         |
| 24 | Aluminum Diisopropoxide Phenyl Salicylate | Z |    |         | 750/690 |
| 25 | Aluminum Diisopropoxide Methoryethoxide | AA |    |         | 900/860 |
| 26 | Aluminum Diisopropoxide Methoryethoxide | BB | 600/500 | 650/530 | 750/565 |
| 27 | Trioxyaluminum Triisopropoxide       | CC | 550/455 | 650/515 | 700/560 |
| 28 | Aluminum Trismethoxy Ethoxide        | DD | 550/460 | 550/440 | 750/655 |

| Resin Example Number | Aluminum Derivative | Solution Example Number | 1.2% | 1.4% | 1.5% | 1.6% | 1.7% | 1.8% | Temp. |
|---|---|---|---|---|---|---|---|---|---|
| 20 | Aluminum Triacetylacetonate          | V  |         |          |         |           |         | 500/430 | 60° |
| 21 | Aluminum Isopropoxide Dilinoleate    | W  | 700/680 | 700/580  |         | 750/680   |         |         | 60° |
| 22 | Aluminum Diisopropoxide Phenoxide    | X  | 550/480 | 500/400  |         | 550/450   |         |         | 60° |
| 23 | AlP with 2% Propylene Phenoxide      | Y  |         | 600/500  | 750/755 | 750/690   | 950/870 |         | 60° |
| 24 | Aluminum Diisopropoxide Phenyl Salicylate | Z |     |          |         |           |         | 900/860 | 60° |
| 25 | Aluminum Diisopropoxide Methoryethoxide | AA |      |          |         |           |         | 3550/off scale | 60° |
| 26 | Aluminum Diisopropoxide Methoryethoxide | BB | 750/620 | 1000/915 |       | 1300/1170 |         |         | 60° |
| 27 | Trioxyaluminum Triisopropoxide       | CC | 750/700 | 850/770  |         | 950/900   |         |         | 60° |
| 28 | Aluminum Trismethoxy Ethoxide        | DD | 750/660 | 1000/845 |         | 1500/1120 |         |         | 60° |

EXAMPLES 29 – 35

Organoaluminum styrene solutions of Examples EE–KK above are incorporated at various respective concentrations into a commerically available resin and the viscosity of each resulting liquid is determined.

The resin used is a commercial resin designated "a hand lay-up spray resin" which is said to have been made using 60% phthalic anhydride, 40% maleic anhydride for the acid portion, and 10% propylene glycol over that theoretically necessary to react. This resin is hot diluted to 71% non-volatile resin with inhibited styrene and it is contemplated that it would be further diluted with styrene to achieve a final NVR content of 46%.

3099 gm portions of this resin are warned to 60° C. and a premix from Examples EE–KK is added with good agitation. Agitation is continued for a minimum of 10 minutes while the temperature is maintained at 60° C for 4 hours. The resin is cooled and viscosity determinations are made at 25° C. The entries in Table VIII represent low shear measurement/high shear measurement as described above for Examples 8-28.

Each resultant product solution thus contained:

| 2200 gm | NVR =    | 46% |
|---|---|---|
| 2583 gm | Styrene = | 54% | and organoaluminum compound as called for.

Each of the product systems is conventionally curable with peroxide initators to a solid resin with excellent physical and chemical properties.

TABLE VIII
COMMERCIALLY AVAILABLE RESIN PLUS ORGANOALUMINUM COMPOUND
(At 46% NVR this resin has a viscosity at 0% Al of approx. 100)

| Example No. | Aluminum Derivative | Solution Example | 0 | .46% | .61% | .77% | .92% | 1.07% |
|---|---|---|---|---|---|---|---|---|
| 29 | Aluminum Isopropoxide | EE | 100/55 | 150/65 | 200/70 | 200/75 | 225/105 | 700/530 |
| 30 | Aluminum Isopropoxide | FF |        |        |        |        |         | 300/135 |

TABLE VIII-continued
COMMERCIALLY AVAILABLE RESIN PLUS ORGANOALUMINUM COMPOUND
(At 46% NVR this resin has a viscosity at 0% Al of approx. 100)

| | | | | | | | | |
|---|---|---|---|---|---|---|---|---|
| 31 | Aluminum Isopropoxide | GG | | | | | | |
| 32 | Alumium Sec-Butoxide | HH | 200/65 | 200/65 | 200/70 | 200/70 | 200/70 | 200/100 |
| 33 | Aluminum Sec-Butoxide | II | 200/60 | 200/65 | 200/65 | 200/75 | 200/75 | 200/95 |
| 34 | Aluminum Sec-Butoxide | JJ | 150/65 | 150/65 | 150/65 | 150/65 | 150/70 | 200/85 |
| 35 | Alumunim Sec-Butoxide | KK | | | | | | |

| Example No. | Aluminum Derivative | Solution Example | 1.15% | 1.27% | 1.3% | 1.4% | 1.5% | Temp. |
|---|---|---|---|---|---|---|---|---|
| 29 | Aluminum Isopropoxide | EE | | off scale | | | | 60° |
| 30 | Aluminum Isopropoxide | FF | | 700/495 | | Off Scale | | 60° |
| 31 | Aluminum Isopropoxide | GG | 300/170 | 500/340 | 800/595 | Off Scale | | 60° |
| 32 | Aluminum Sec-Butoxide | HH | | 400/160 | | | | 25° |
| 33 | Aluminum Sec-Butoxide | II | | 250/130 | | | | 60° |
| 34 | Aluminum Sec-Butoxide | JJ | | 200/120 | | | | 60° |
| 35 | Aluminum Sec-Butoxide | KK | | 250/100 | | 250/160 | 400/280 | 60° |

I claim:

1. A sotrage stable substantially anhydrous copolymerizable non-Newtonian liquid unsaturated polyester resin composition, said composition being the reaction product of the following components on an initial 100 weight percent total composition basis:
   A. from about 20 to 90 weight percent of an unsaturated polyester resin having a molecular weight ranging from about 1000 to 30000 and comprised of a condensate of at least one polyol with at least one polycarboxylated compound,
   B. from about 0.1 to 20.0 weight percent of at least one organoaluminum compound the exact amount of said organ aluminum compound present in any given said composition being such that said composition remains in a liquid condition, and
   C. from about 10 to 80 weight percent of a liquid comprising at least one vinyl monomer having a molecular weight ranging from about 100 to 250 and having a boiling point greater than about 100° C., said components (A) and (B) being substantially completely dissolved in said component (C), said component (B) first being dissolved in a portion of said component (C) before being blended with a solution of said component (A) in another portion of said component (C), said organoaluminum compound being characterized by:
   a. containing at least one aluminum atom per molecule,
   b. containing at least one oxygen atom per molecule,
   c. containing at least four carbon atoms per molecule at least two of which are bonded directly to one another by one or two bonds in a carbon-to-carbon chain,
   d. each said aluminum atom having three bonds and being bonded by at least one of such bonds to one of the carbon atoms in said chain through one of said oxygen atoms intermediately, said carbon atom so bonded having additionally no oxygen atoms double bonded thereto,
   e. being soluble in styrene to a weight percentage at least about equal to the weight percentage of such organoaluminum compound is employed in a given such resin composition,
   f. having a formula weight of from about 130 to 1000, and
   g. causing a cloudy dispersion of alumina particles to form when a 10 weight percent solution of such organoaluminum compound in anhydrous benzene is admixed with benzene saturated with distilled water and the resulting mixture is heated for four hours at 60° C.

2. The polyester resin composition of claim 1 additionally having admixed therewith on a 100 weight percent total composition basis from about 50 to 500 parts per million of at least one inhibitor.

3. A copolymerized resin composition of claim 1.

4. A copolymerized resin composition of claim 2 wherein, prior to copolymerization, there is admixed with said resin composition of claim 2 a curing composition, the amount thereof so admixed therewith being at least sufficient to produce copolymerization of said resin composition of claim 2 said curing composition comprising on a 100 weight percent total mixture basis:
   A. from about 0.5 to 2 weight percent of at least one initiator,
   B. from about 0.2 to 2.0 weight percent of at least one promoter,
   C. from 0 to about 0.5 weight percent of at least one accelerator, and
   D. from about 50 to 500 parts per million of at least one inhibitor.

5. The polyester resin composition of claim 1 wherein said unsaturated polyester resin is a condensate of an ingredient mixture which initially comprises on a 100 weight percent total mixture basis
   A. from about 20 to 65 weight percent of at least one first carboxylic acid material selected from the group consisting of aromatic dicarboxylic acids and anhydrides thereof, said first carboxylic acid material having its carboxylic group carbon atoms bonded directly to a ring carbon atoms and further having from 8 through 12 carbon atoms per molecule, B. from about 10 to 50 weight percent of at least one second carboxylic acid material selected from the group consisting of ethylenically unsaturated aliphatic dicarboxylic acids and anhydrides thereof, said second carboxylic acid material having from 4 through 7 carbon atoms per molecule, and C. from about 40 to 60 weight percent of at least one saturated glycol containing from 2 through 7 carbon atoms per molecule, the respective quantity of component (C) relative to components (A) and (B) being such that said condensate can comprise a substantially completely non-volatile resin.

6. The polyester resin composition of claim 5 wherein
A. said first carboxylic acid material is selected from the group consisting of phthalic anhydride and isophthalic acid,
B. said second carboxylic acid material is selected from the group consisting of maleic anhydride and fumaric acid, and
C. said glycol is selected from the group consisting of ethylene glycol, propylene glycol, and diethylene glycol.

7. The polyester resin composition of claim 1 wherein said organoaluminum compound is selected from the group consisting of aluminum alkoxides containing from about 4 to 60 carbon atoms per molecule, aluminum alkenyloxides containing from about 4 to 60 carbon atoms per molecule, aluminum aryloxides containing from about 18 to 60 carbon atoms per molecule, aluminum alkoxyalkoxides containing from 5 to 60 carbon atoms per molecule, aluminum alkoxy (alkoxy)$_n$ alkoxides wherein n ranges from 1 through 4 and containing from 6 to 60 carbon atoms per molecule, and aluminum acyloxides containing from 4 to 60 carbon atoms per molecule.

8. The polyester resin composition of claim 1 wherein said organoaluminum compound is selected from the group consisting of aluminum tri-sec butoxide, aluminum tri isopropoxide, aluminum tri methoxyethoxide, aluminum tri ethoxyethoxide, and aluminum tri-2-ethyl hexyloxide.

9. The polyester resin composition of claim 1 wherein said liquid comprises a vinyl monomer selected from the group consisting of styrene, vinyl toluene, and methyl methacrylate.

10. The polyester resin composition of claim 2 wherein said inhibitor comprises at least one material selected from the group consisting of hydroquinone, methyl hydroquinone, and t-butyl catechol.

11. The composition of claim 4 wherein said initiator is an organic peroxide.

12. The composition of claim 11 wherein said peroxide is selected from the group consisting of diacyl peroxides, diacyl acid peroxides, ketone peroxides, aldehyde peroxides, alkyl peresters, and alkyl hydroperoxides.

13. The composition of claim 4 wherein said accelerator is selected from the group consisting of heavy metal salts or aromatic monocarboxylic acids, alkyl substituted anilines, quaternary amines containing from 4 to 15 carbon atoms per molecule, and aliphatic monomer-captans containing from 5 to 18 carbon atoms per molecule.

14. The composition of claim 4 wherein said promoter is selected from the group consisting of cobalt naphthenate, and cobalt octoate.

15. The composition of claim 4 wherein said inhibitor is selected from the group consisting of hydroquinone, methyl hydroquinone, 16. The resin composition of claim 3 which is substantially clear.

17. The composition of claim 1 comprising on a 100 weight percent total composition basis
A. from about 40 to 70 weight percent of said unsaturated polyester resin,
B. from about 0.2 to 10 weight percent of said organoaluminum compound,
C. from about 30 to 60 weight percent of said liquid.

18. The composition of claim 1 comprising on a 100 weight percent total composition basis
A. from about 40 to 65 weight percent of said unsaturated polyester resin,
B. from about 0.2 to 10 weight percent of said organoaluminum compound,
C. from about 35 to 60 weight percent of said liquid, said composition having a Brookfield viscosity of from about 500 to 7000 at a shear rate of about 1.2 sec$^{-1}$ at 25° C and said composition having a thix index of from about 1.1 to 7.5 at 25° C.

19. A process for making a liquid copolymerizable polyester resin comprising the steps of:
A. condensing at least one polyol with a polycarboxylated material at least one component of which is unsaturated at elevated temperatures to form an unsaturated polyester resin comprised substantially completely of non volatile resin having a molecular weight ranging ranging from about 1,000 to 30,000

B. dissolving said unsaturated polyester resin in a solvent comprised of at least one vinyl monomer having a molecular weight ranging from about 100 to 250 and having a boiling point greater than about 100° C to form a first solution comprising initially from about 20 to 90 weight percent of said unsaturated polyester resin with the balance up to 100 weight percent thereof being said vinyl monomer, C. admixing said first solution with a second solution comprising initially from about 0.2 to 50 weight percent of at least one organoaluminum compound with the balance up to 100 weight percent thereof being said vinyl monomer to form a product solution comprising on a 100 weight percent total product solution basis:
1. from about 20 to 90 weight percent of said unsaturated polyester resin,
2. from about 0.1 to 20.0 weight percent of said organoaluminum compound, the exact amount of said organoaluminum compound present in any given such solution being such that such product solution remains in a liquid condition, and
3. from about 10 to 80 weight percent of said vinyl monomer solvent, said organoaluminum compound being characterized by:
a. containing at least one aluminum atom per molecule,
b. containing at least one oxygen atom per molecule,
c. containing at least four carbon atoms per molecule at least two of which are bonded directly to one another by one or two bonds in a carbon-to-carbon chain,
d. each said aluminum atom having three bonds and being bonded by at least one of such bonds to one of the carbon atoms in said chain through one of said oxygen atoms intermediately, said carbon atom so bonded having additionally no oxygen atoms double bonded thereto, e. being soluble in styrene to a weight percentage at least about equal to the weight percentage of such organoaluminum compound is employed in a given such resin composition, f. having a formula weight of from about 130 to 1000, and g. causing a cloudy dispersion of alumina particles to form when a 10 weight percent solution of such organoaluminum compound in anhydrous benzene is admixed with benzene saturated with distilled water and the resulting mixture is heated for four hours at 60° C.

20. The process of claim 19 wherein said solution comprises on a 100 weight percent total solution basis:
1. from about 40 to 70 weight percent of said unsaturated polyester resin,
2. from about 0.2 to 10 weight percent of said organoaluminum compound, and
3. from about 30 to 60 weight percent of said solvent, said solution being further characterized by having a Brookfield viscosity of from about 500 to 7000 cps at a shear rate of about 1.2 sec$^{-1}$ at 25° C and by having a thix index of from about 1.1 to 7.5 at 25° C.

21. A process for making a solid copolymerized polyester resin comprising curing a said solution produced by the process of claim 20.

22. The process of claim 21 wherein prior to said curing a curing composition is admixed with said solution, said curing composition comprising on a 100 weight percent total product mixture basis:
   A. from about 0.5 to 2 weight percent of at least one initiator,
   B. from about 0.2 to 2.0 weight percent of at least one promoter,
   C. from 0 to about 0.5 weight percent of at least one accelerator, and
   D. from about 50 to 500 parts per million of at least one inhibitor.

23. The process of claim 19 wherein said condensation is conducted using an ingredient mixture which initially comprises on a 100 weight percent total mixture basis
   A. from about 20 to 65 weight percent of at least one first carboxylic acid material selected from the group consisting of aromatic dicarboxylic acids and anhydrides thereof, said first carboxylic acid material having its carboxyl group carbon atoms bonded directly to ring carbon atoms and further having from 8 through 12 carbon atoms per molecule,
   B. from about 10 to 50 weight percent of at least one second carboxylic acid material selected from the group consisting of ethylenically unsaturated aliphatic dicarboxylic acids and anhydrides thereof, said second carboxylic acid material having from 4 through 7 carbon atoms per molecule, and
   C. from about 40 to 60 weight percent of at least one saturated glycol containing from 2 through 7 carbon atoms per molecule,
the respective quantity of component (C) relative to components (A) and (B) being such that said condensate can comprise a substantially completely non-volatile resin.

24. The process of claim 23 wherein

A. said first carboxylic acid material is selected from the group consisting of phthalic anhydride and isophthalic acid,
B. said second carboxylic acid material is selected from the group consisting of maleic anhydride and fumaric acid, and
C. said glycol is selected from the group consisting of ethylene glycol, propylene glycol, and diethylene glycol.

25. The process of claim 21 wherein said curing is accomplished with an organic peroxide initiator.

26. The process of claim 25 wherein said peroxide is selected from the group consisting of diacyl peroxides, diacyl acid peroxides, ketone peroxides, aldehyde peroxides, alkyl peresters, and alkyl hydroperoxides.

27. The process of claim 25 wherein said curing is accomplished additionally with an accelerator selected from the group consisting of heavy metal salts of aromatic monocarboxylic acids, alkyl substituted anilines, quaternary amines containing from 4 to 15 carbon atoms per molecule, and aliphatic monomercaptans containing from 5 to 18 carbon atoms per molecule.

28. The process of claim 27 wherein said curing is accomplished additionally with a promoter selected from the group consisting of cobalt naphthenate and cobalt octoate.

29. The process of claim 19 wherein there is additionally dissolved in said solution an inhibitor selection from the grup consisting of hydroquinone, methyl hydroquinone, and t-butyl catechol.

30. A process for increasing and regulating the viscosity of a first solution comprising initially on a 100 weight percent basis
   from about 20 to 90 weight percent of an unsaturated polyester resin having a molecular weight ranging from about 1000 to 30000 and comprised of a condensate of at least one polyol with at least one polycarboxylated compound and
   the balance up to 100 weight percent of any given such first solution being a liquid comprising at least one vinyl monomer having a molecular weight ranging from about 100 to 250 and having a boiling point greater than about 100° C.

comprising the steps of admixing with said first solution a second solution comprising initially on a 100 weight percent basis
   from about 0.2 to 20.0 weight percent of at least one organoaluminum compound characterized by:
   a. containing at least one aluminum atom per molecule,
   b. containing at least one oxygen atom per molecule,
   c. containing at least four carbon atoms per molecule at least two of which are bonded directly to one another by one or two bonds in a carbon-to-carbon chain,
   d. each said aluminum atom having three bonds and being bonded by at least one of such bonds to one of the carbon atoms in said chain through one of said oxygen atoms intermediately, said carbon atom so bonded having additionally no oxygen atoms double bonded thereto,
   e. being soluble in styrene to a weight percentage at least about equal to the weight percentage of such organoaluminum compound is employed in a given such resin composition,
   f. having a formula weight of from about 200 to 300, and g. causing a cloudy dispersion of alumina particles to form when a 10 weight percent solution of such organoaluminum compound in anhydrous benzene is admixed with benzene saturated with distilled water and the resulting mixture is heated for four hours at 60° C.

the exact amount of saih organoaluminum compound present in any given resulting mixed solution being such that said composition remains in a liquid condition, the balance up to 100 weight percent of any given such second solution being said liquid, and thereafter permitting the resulting mixed solution to age for a time sufficient to permit said resulting solution to increase in viscosity, the total quantity of said second solution so admixed with said first solution being such as to increase the final viscosity of said resulting solution to a desired extent.

31. The process of claim 30 wherein said unsaturated polyester resin is a condensate of an ingredient mixture which initially comprises on a 100 weight percent total mixture basis A. from about 20 to 65 weight percent of at least one first carboxylic acid material selected from the group consisting of aromatic dicarboxylic acids and anhydrides thereof, said first carboxylic acid material having its carboxylic group carbon atoms bonded directly to ring carbon atoms and further having from 8 through 12 carbon atoms per molecule, B. from about 10 to 50 weight percent of at least one second carboxylic acid material selected from the group consisting of ethylenically unsaturated aliphatic dicarboxylic acids and anhydrides thereof, said second carboxylic acid material having from 4 through 7 carbon atoms per molecule, and C. from about 40 to 60 weight percent of at least one saturated glycol containing from 2 through 7 carbon atoms per molecule, the respective quantity of component (C) relative to components (A) and (B) being such that said condensate can comprise a substantially completely non-volatile resin.

* * * * *

UNITED STATES PATENT AND TRADEMARK OFFICE
CERTIFICATE OF CORRECTION

PATENT NO. : 4,049,748
DATED : September 20, 1977
INVENTOR(S) : Wesley T. Bailey It is certified that error appears in the above-identified patent and that said Letters Patent are hereby corrected as shown below:

Column 1, lines 48-50, cancel "; such as where solid polyester resins are needed or desired; such as where solid polyester resins are needed or desired".

Column 1, line 55, insert "--" before and after "wicking".

Column 7, line 44, change "thoxides" to --thoxide--.

Column 8, line 49, cancel "polester" and insert --polyester--.

Column 9, line 18, cancel "centipose" and insert --centipoise--.

Column 9, line 28, cancel "gelatin" and insert --gelation--.

Column 10, line 20, insert "--" before and after "thinning tank".

Column 10, line 23, cancel "polester" and insert --polyester--.

Column 10, line 27, cancel "100" and insert --1000--.

Column 15, line 8, cancel "increase" and insert --decrease--.

Column 16, line 23, cancel "inhibitor" and insert --initiator--.

Column 17, line 27, cancel "my" and insert --may--.

Column 21, lines 19 and 20, cancel "to product a produce" and insert --to produce a product--.

UNITED STATES PATENT AND TRADEMARK OFFICE
CERTIFICATE OF CORRECTION

PATENT NO. : 4,049,748
DATED : September 20, 1977
INVENTOR(S) : Wesley T. Bailey It is certified that error appears in the above-identified patent and that said Letters Patent are hereby corrected as shown below:

Column 22, line 36, insert "--" before and after "ASB"

Column 23, line 12, insert "--" before and after "running" and "sagging"

Column 24, line 13, cancel "hydrophobit" and insert --hydrophobic--.

Column 24, line 67, after "case", cancel "in" and insert --is--.

Column 25, line 10, cancel "SPI" and insert --PSI--.

Column 25, line 23, cancel "as" and insert --has--.

Column 26, line 1, cancel "Example" and insert --Examples--.

Column 26, line 24, after "follows" insert --:--.

Column 27, line 58, cancel "warned" and insert --warmed--.

Column 29, line 27, cancel "sotrage" and insert --storage--.

Column 29, line 39, cancel "organaluminum" and insert --organoaluminum--.

UNITED STATES PATENT AND TRADEMARK OFFICE
CERTIFICATE OF CORRECTION

PATENT NO. : 4,049,748
DATED : September 20, 1977
INVENTOR(S) : Wesley T. Bailey It is certified that error appears in the above–identified patent and that said Letters Patent are hereby corrected as shown below:

Column 32, line 3, after "methyl hydroquinone" insert --and t-butyl catechol--.

Column 32, line 31, cancel "ranging" (second Occurrence).

Column 34, line 29, cancel "grup" and insert --group--.

Column 35, line 7, cancel "saih" and insert --said--.

Signed and Sealed this

Eighth Day of August 1978

[SEAL]

Attest:

RUTH C. MASON
*Attesting Officer*

DONALD W. BANNER
*Commissioner of Patents and Trademarks*